United States Patent

Kurokawa et al.

[11] Patent Number: 5,887,088
[45] Date of Patent: Mar. 23, 1999

[54] INPUTTING DEVICE AND INPUTTING METHOD FOR INFORMATION PROCESSING SYSTEM

[75] Inventors: Takeshi Kurokawa; Hiroshi Iida; Eiichi Yamauchi; Shigeru Yamada, all of Kanagawa, Japan

[73] Assignee: Fuji Xerox Co., Ltd., Tokyo, Japan

[21] Appl. No.: 837,484

[22] Filed: Apr. 18, 1997

Related U.S. Application Data

[63] Continuation of Ser. No. 325,527, Oct. 19, 1994, abandoned.

[30] Foreign Application Priority Data

Oct. 27, 1993 [JP] Japan ................... 5-291400

[51] Int. Cl.⁶ ................................................. G06K 9/20
[52] U.S. Cl. ................................. 382/317; 358/403
[58] Field of Search ................................. 382/317, 306; 358/402, 403, 440, 468; 395/766, 767, 768, 769; 707/505, 506, 507, 508

[56] References Cited

U.S. PATENT DOCUMENTS 5,282,052   1/1994   Johnson et al. .................... 382/317

FOREIGN PATENT DOCUMENTS

| | | |
|---|---|---|
| Sho. 57-60456 | 4/1982 | Japan . |
| Sho. 63-8889 | 1/1988 | Japan . |
| Sho. 63-242060 | 10/1988 | Japan . |
| Hei. 1-183771 | 7/1989 | Japan . |
| Hei. 2-291767 | 12/1990 | Japan . |
| Hei. 3-74771 | 3/1991 | Japan . |
| Hei. 3-40862 | 6/1991 | Japan . |
| Hei. 3-174660 | 7/1991 | Japan . |
| Hei. 4-321183 | 11/1992 | Japan . |

*Primary Examiner*—Phuoc Tran
*Attorney, Agent, or Firm*—Finnegan, Henderson, Farabow, Garrett & Dunner, L.L.P.

[57] ABSTRACT

A novel input device and for an information processing system for carrying out a process on the basis of input data, the input device is disclosed. In the input device, the output unit develops instructive-document form information and outputs an instructive document to which an entry is not yet made by a user. The extracting unit extracts analysis information for analyzing an instructive document to which an entry has been made by the user from the instructive-document form information. The storing unit stores the extracted analysis information. The analyzing unit analyzes the information on the received instructive document after a user makes an entry to thereto while referring to the analysis information. With such an arrangement, the input device receives the information on the instructive document having entries made thereto, and inputs information obtained by the process of analyzing the received information to the information processing system.

9 Claims, 34 Drawing Sheets

```
%!PS-ADOBE-2.0
%% CREATOR: SHIGERU YAMADA
%% TITLE: FORM SHEET
%% CREATIONDATE: 16-SEP-92
%% DOCUMENTFONTS: TIMES-ROMAN RYUMIN-LIGHT-H
%% BOUNDINGBOX: 36 36 562 806
%% ENDCOMMENTS (lusrlimguilliblpslformlib.ps) run
BEGINFORM
%% ENDPROLOG
%% PAGE11
RegistrationMark
<2555 2529 213C 255E 2543 2548 4D51 3B66 4E63> FormTitle
<aaaa> FormID 0 1 ToPSPos moveto
480 0 rlineto
5 setlinewidth
STROKE
0 2 <252A 255A 256C 213C 2537 2567 2573 2127> 1 12 LabelOnly
10 2 <2539 2548 2522> 1 12 (SAVE) () 1 0 0 CheckBox
0 4 ToPSPos moveto
480 0 rlineto
5 setlinewidth
stroke 127 <2154 2539 2548 2522 2121 252A 2557 2537 2567 2573 2155> 1 12
LabelOnly
0 10 <215A 252B 2546 2534 256A 215B> 1 12 LabelOnly
9 12 <353B 3D51> 1 10 (CATEGORY) (TECHNICAL) 2 1 1 CheckBox
19 12 <3757 3268> 1 10 (CATEGORY) (PLAN) 3 1 1 CheckBox
29 12 <3144 3648> 1 10 (CATEGORY) (SALES) 4 1 1 CheckBox
9 14 <3F4D 3B76> 1 10 (CATEGORY) (PERSONNEL) 5 1 1 CheckBox
19 14 <243D 244E 423E> 1 10 (CATEGORY) (OTHER) 6 1 1 CheckBox
0 17 <215A 2555 2521 2524 256B 2535 213C 2550 215B> 1 12 LabelOnly
9 19 <2535 213C 2550 2331> 1 10 (FILE-SERVER) (SERVER 1) 7 1 0 CheckBox
19 19 <2535 213C 2550 2332> 1 10 (FILE-SERVER) (SERVER 2) 8 1 0 CheckBox

SHOWPAGE

ENDFORM

%% TRAILER
```

*FIG. 3*

```
# FORM ID = aaaa
# < item > ^ < x1 > ^ < y1 > ^ < x2 > ^ < y2 > ^ < x1 > ^ < y1 > ^ < func > ^ < value > ^ <
uid > ^ < pid > ^ < gid >
CB ^ 144 ^ 144 ^ 10 ^ 2 ^ 12 ^ 12 ^ SAVE ^^ 1 ^ 0 ^ 0
CB ^ 132 ^ 264 ^ 9 ^ 12 ^ 12 ^ 12 ^ CATERGORY ^ Technical ^ 2 ^ 1 ^ 1
CB ^ 252 ^ 264 ^ 19 ^ 12 ^ 12 ^ 12 ^ CATERGORY ^ Plan ^ 3 ^ 1 ^ 1
CB ^ 372 ^ 264 ^ 29 ^ 12 ^ 12 ^ 12 ^ CATEGORY ^ Sales ^ 4 ^ 1 ^ 1
CB ^ 132 ^ 288 ^ 9 ^ 14 ^ 12 ^ 12 ^ CATEGORY ^ Personnel ^ 2 ^ 1^ 1
CB ^ 252 ^ 288 ^ 19 ^ 14 ^ 12 ^ 12 ^ CATEGORY ^ Other ^ 6 ^ 1 ^ 1
CB ^ 132 ^ 348 ^ 9 ^ 19 ^ 12 ^ 12 ^ FILE-SERVER ^ Server1 ^ 7 ^ 1 ^ 0
CB ^ 252 ^ 348 ^ 19 ^ 19 ^ 12 ^ 12 ^ FILE-SERVER ^ Server2 ^ 8 ^ 1 ^ 0
```

*FIG. 4*

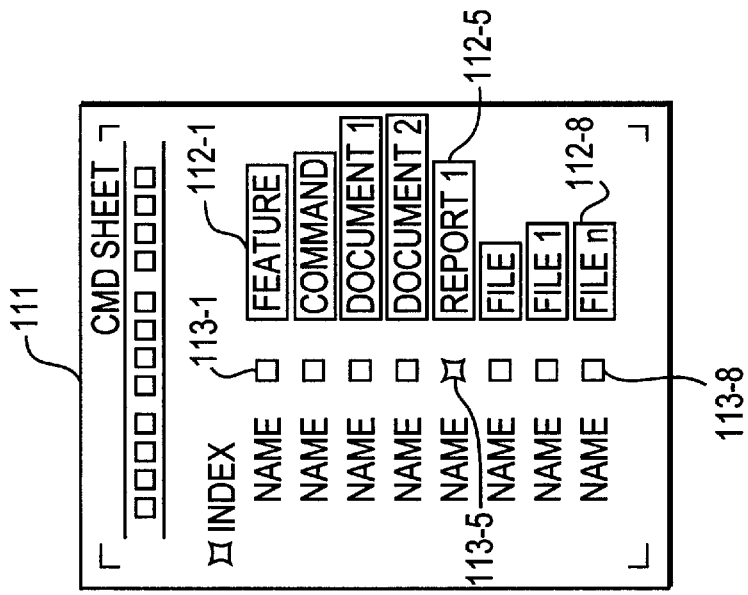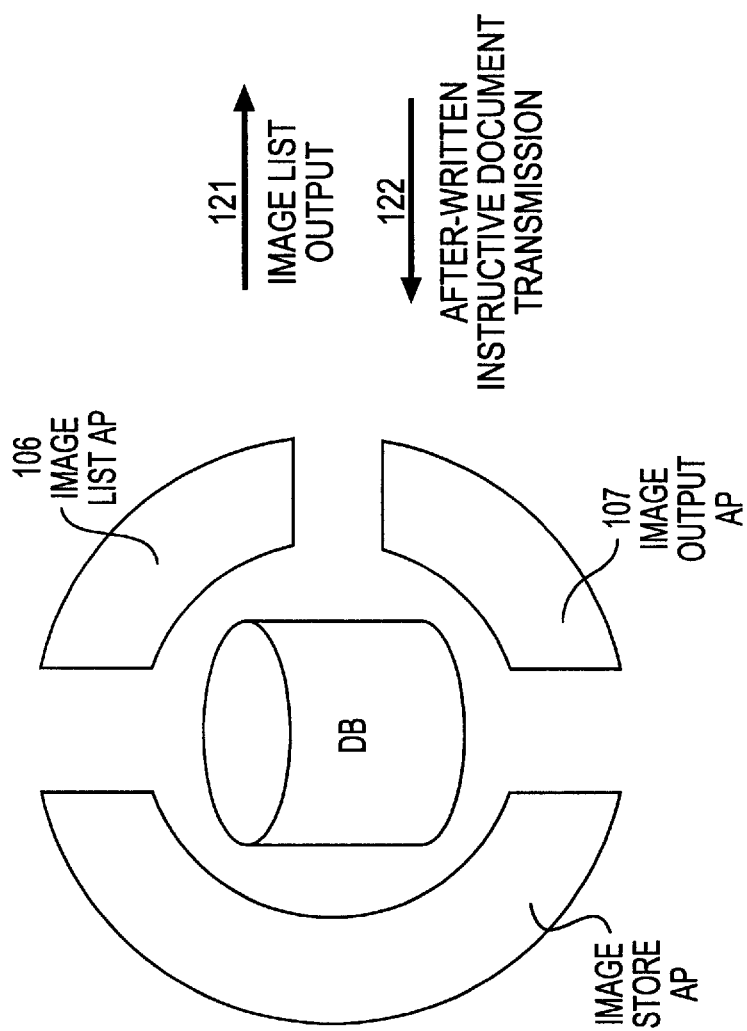
FIG. 7

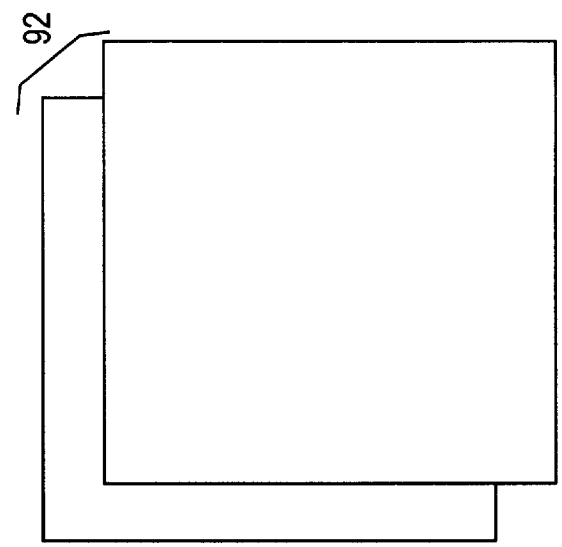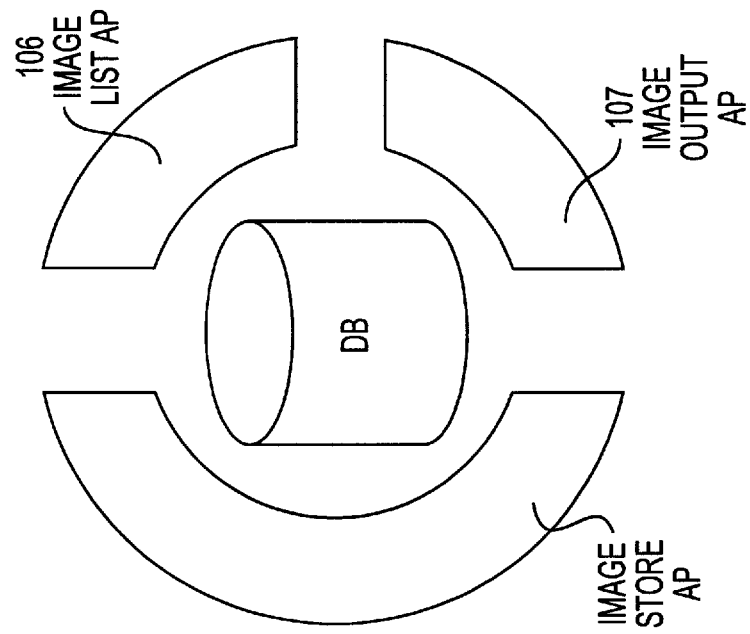
FIG. 8

FIG. 11

```
                                            ┌─ 201
                ┌────────────────────────────┴──────────┐
                │  ┌─ ─ ─ ─ ─ ─ ─ ─ ─ ─ ─ ─ ─ ─ ─ ─ ─┐ │
                │                                       │
                │    BUSINESS DAILY           ┌─────┐   │
                │    REPORT 1                 │6 1 0 1│ │
                │                             └─────┘   │
                │    CUSTOMERS (SHOPS)                  │
                │         • VINE          • SAKURA      │
                │                                       │
                │         • MATSA         • TAKE        │
                │                                       │
                │    CALL DATE                          │
                │       ┌─┐        ┌──┐      ┌──┐       │
                │       │8│ MONTH  │2│8│DATE │1│3│HOUR  │
                │       └─┘        └──┘      └──┘       │
                │       ┌─┐                             │
                │       │2│ TIME              ↙─ D      │
                │       └─┘                             │
                │    REMARKS                            │
                │    ┌─────────────────────────────┐    │
                │    │                             │    │
                │    │       ESTIMATE OF FAX       │    │
                │    │                             │    │
                │    └─────────────────────────────┘    │
                │                                       │
                │    STORAGE = BUSINESS DAILY REPORT/DATA│
                │  └─ ─ ─ ─ ─ ─ ─ ─ ─ ─ ─ ─ ─ ─ ─ ─ ─┘ │
                └───────────────────────────────────────┘
```

FIG. 22

| ITEM ID | GROUP ID | ITEM FUND | POSITION | SIZE | DIGIT NUMBER | TITLE |
|---|---|---|---|---|---|---|
| 1 | 1 | CHECKDOT | (3, 4) | X | X | VINE |
| 2 | 1 | CHECKDOT | (12, 4) | X | X | SAKURA |
| 3 | 1 | CHECKDOT | (3, 6) | X | X | MATSU |
| 4 | 1 | CHECKDOT | (12, 6) | X | X | TAKE |
| 5 | 2 | NUMERIC | (3, 10) | X | 2 | MONTH |
| 6 | 2 | NUMERIC | (6, 10) | X | 2 | DATE |
| 7 | 2 | NUMERIC | (9, 10) | X | 2 | HOUR |
| 8 | 2 | NUMERIC | (3, 12) | X | 2 | TIME |
| 9 | 3 | HANDWRITE | (3, 16) | (16, 4) | X | REMARKS |

*FIG. 23*

```
FORMSHEET 6001 {
    FORMNAME = "BUSINESS DAILY REPORT1"        ITEM {
    FORMBROUP = "BUSINESS DAILY REPORT/DATA"       ITEMID = 6;
    ITEM {                                         GROUPID = 2;
        ITEMID = 1;                                ITEMKIND = NUMERIC;
        GROUP ID = 1;                              POSITION = (6, 10);
        ITEMKIND = CHECKDOT;                       TITLE = "DATE"
        POSITION = (3, 4);                     }
        TITLE = "UME";                         ITEM {
    }
    ITEM {                                         ITEMID 7;
        ITEMID = 2;                                GROUPID = 2;
        GROUPID = 1;                               ITEMKIND = NUMERIC;
        ITEMKIND = CHECKDOT;                       POSITION = (3, 10);
        POSITION = (2, 4);                         TITLE = "HOUR";
        TITLE = "SAKURA";                      }
                                               ITEM {
    }
    ITEM {                                         ITEMID = 8;
        ITEMID = 3;                                GROUPID = 2;
        GROUPID = 1;                               ITEMKIND = NUMERIC;
        ITEMKIND = CHECKDOT;                       POSITION = (3, 12);
        POSITION = (3, 6);                         TITLE = "TIME";
        TITLE = "MATSU";                       }
                                               ITEM {
    }
    ITEM {                                         ITEMID = 9;
        ITEMID = 4;                                GROUPID = 3;
        GROUPID = 1;                               ITEMKIND = HANDWRITE;
        ITEMKIND = CHECKDOT;                       POSITION = (3, 16);
        POSITION = (12, 6);                        TITLE = "REMARKS";
        TITLE = "TAKE";                        }
    }                                      }
    ITEM }
        ITEMID = 5;
        GROUPID = 2;
        ITEMKIND = NUMERIC;
        POSITION = (3, 10);
        TITLE = "MONTH";
```

*FIG. 24*

QUESTIONNAIRE REPORT    6 8 0 2

QUESTIONNAIRE FORM ID = 6001

Q1: HOW DID YOU KNOW THIS BOOK?
- ON ADVERTISING OF NEWSPAPER/MAGAZINE    1
- FROM FRIEND    3
- IN BOOKSTORE    2
- OTHERS    0

Q2: WHAT DO YOU THINK OF PRICE OF THIS BOOK?
- EXPENSIVE    4
- INEXPENSIVE    2

Q3: HOW MANY BOOKS DO YOU BUY FOR A MONTH?
- 0    2
- 1    2
- 3    1
- 5    1

FIG. 29

| | |
|---|---|
| INTEGER | ITEM KIND = CHECKDOT<br>ITEM ID = 1 |
| INTEGER | ITEM KIND = CHECKDOT<br>ITEM ID = 2 |
| INTEGER | ITEM KIND = CHECKDOT<br>ITEM ID = 3 |
| INTEGER | ITEM KIND = CHECKDOT<br>ITEM ID = 4 |
| IMAGE FILE NAME | ITEM KIND = HANDWRITE<br>ITEM ID = 5 |
| INTEGER | ITEM KIND = CHECKDOT<br>ITEM ID = 6 |
| INTEGER | ITEM KIND = CHECKDOT<br>ITEM ID = 6 |
| LENGTH = ARRAY OF 100 INTEGERS | ITEM KIND = NUMERIC<br>ITEM ID = 8 |

*FIG. 31* ing a full keyboard, a display device, or the like.
INPUTTING DEVICE AND INPUTTING METHOD FOR INFORMATION PROCESSING SYSTEM This application is a continuation, of application Ser. No. 08/325,527, filed Oct. 19, 1994, now abandoned.

BACKGROUND OF THE INVENTION

1. Field of the Invention

The present invention relates to an input device for an information processing system, and an input method for the information processing system. More particularly, the invention relates to an input device for an information processing system which receives instructions from a user through an instructive document and transform the received instructions into such data as to be acceptable by the information processing system, and an input method for the information processing system.

2. Discussion of the Related Art

An input method using a mark sheet (referred to as "a mark-sheet input method") for an information processing system is known as one of the input methods for inputting data into an information processing system. The mark-sheet method has advantages of its own, which cannot be found in the input method using a full keyboard or a mouse. For this reason, the mark-sheet method is still used for the totalizing on questionnaire, marking on test, totalizing on orders received, and the like.

A first advantage of the mark-sheet method is that a user need not memorize related commands one by one. A second advantage thereof is that the user can indicate desired items and instructive items with only a pencil, and hence each user need not have a keyboard or a display. Another advantage is that tick marks or painting of the check boxes can directly be read and input into the information processing system. An additional advantage is that mark sheets may be stored and transported in a stacked state (The term "check box" means an area on a sheet to be ticked or painted. The wording "marking with a tick mark, painted out for tick, and the like" will be referred simply to "tick".).

This mark-sheet method may be used also for the general input method for an information processing system. This input method using the mark-sheet is disclosed in Published Unexamined Japanese Patent Application Nos. Sho. 57-60456, 63-8889, and 63-242060, and Hei. 1-183771 and 2-291767, and Japanese Patent Publication No. Hei. 3-40862, and the like.

The work using the information processing system may roughly be categorized into two types, first work continuously performed (referred to as continuous work) and second work discontinuously performed (referred to as discontinuous work). An example of the continuous work is the document preparation work. In the document preparation work, an operator forms a document on the screen of the display device, while manually operating a keyboard or a mouse. An example of the discontinuous work is the work to make an access to a data base. In the data base access work, an operator enters a keyword to retrieve desired information, prints out the retrieval results on a sheet, carefully examines the results, and makes an access to the data base again on the basis of the results of the examination to retrieve further detailed information.

The mark-sheet method is suitable for the discontinuous work. The continuous work proceeds while seeing a display on the screen. Therefore, if the mark-sheet method is applied to the discontinuous work, much ore time is taken for the work.

In the case of the discontinuous work, the following situation frequently takes place. The work to access the data base, for example, may be more efficiently done when a user moves to a location where materials are stored. In this case, the mark-sheet method is superior since in the mark-sheet method, the data base access work may be performed without a full keyboard, a display device, or the like.

Also in the above-mentioned conventional art, the mark-sheet method is applied to this field. Particularly, in the publications of Published Unexamined Japanese Patent Application Nos. Sho. 63-242060, Hei. 1-183771 and Hei 2-291767, a mark sheet is transmitted by a facsimile machine. In these days, the facsimile machines are widespread as telephone sets. Therefore, the mark-sheet method using the facsimile machines may make full use of the advantages of this method.

The conventional mark sheet method have some problems to be solved when applied to the general input method for the information processing system.

Firstly, in the mark-sheet method, the mark sheet is not flexible in the layout thereon. Timing marks are located at the upper side and/or the lower side or the right side and/or the left side on the mark sheet. The timing marks are used as reference marks when the mark sheet is read. The check boxes must be formed at the locations associated with the timing marks (FIG. 26, reference numeral 56, and others in Published Unexamined Japanese Patent Application No. Hei. 2-291767, for example). In other words, the check boxes must be placed at limited locations on the mark sheet.

For this reason, it is difficult to obtain an easy-to-understand layout of the mark sheet.

Let us consider a case where a list of files hierarchically stored is taken out by using a "DIR" command, and a desired file is read out of the list.

In this case, the employment of a tree structure for the list is preferable, for the sake of easy-to-see. Check boxes to be selected, explanations and the like are preferably located on the side of the file names.

As described above, the locations of the check boxes are limited in the conventional mark-sheet method. The limited locations of the check boxes make it difficult to use the tree structure, and to lay out check boxes and explanations in a balanced and easy-to-see fashion.

Secondly, the processes on the mark sheet, such as outputting, read, and analysis is developed every application software, and are handled as the combination of those processes and the application software thereof ("application software" will be referred to simply as "application").

To set or alter the layout on the mark sheet and the display contents in accordance with a situation where the mark sheet is output, uses of the mark sheet, and the like, an increased number of developing processes is required for developing and altering the software. This makes it difficult to develop and alter the software.

SUMMARY OF THE INVENTION

The present invention has been made in view of the above circumstances and has an object to provide an input device for an information processing system in which the advantages peculiar to the mark-sheet method are fully utilized, the layout on the mark sheet may be changed, modified and altered as desired, and the setting and altering of the locations of the check boxes and explanations on a sheet or document are easy.

Another object of the present invention is to provide an input method for the information processing system which has substantially the same advantageous features as of the input device.

According to a first aspect of the invention, there is provided an input device for an information processing system for carrying out a process on the basis of input data, the input device comprising: output means for developing instructive-document form information and outputting an instructive document before an entry is made thereto by a user (referred to as a before-written instructive document); extracting means for extracting analysis information for analyzing an instructive document after an entry is made thereto by the user (referred to as an after-written instructive document) from the instructive-document form information; storing means for storing the extracted analysis information; and analyzing means for analyzing the information on the after-written instructive document received while referring to the analysis information, wherein the input device receives the information on the after-written instructive document, and inputs information obtained by the process of analyzing the received information to the information processing system.

According to a second aspect of the invention, there is provided an input method for an information processing system for carrying out a process on the basis of input data, the input method comprising: an outputting procedure for developing instructive-document form information and outputting a before-written instructive document; an extracting procedure for extracting analysis information for analyzing an after-written instructive document from the instructive-document form information; a storing procedure for storing the analysis information extracted by the extracting procedure in storing means; and an analyzing procedure for analyzing the information on the after-written instructive document received while referring to the analysis information, wherein the input device receives the information on the after-written instructive document, and inputs information obtained by the process of analyzing the received information to the information processing system.

According to a third aspect of the invention, there is provided an input device for an information processing system for carrying out a process on the basis of input data, the input device comprising: output means for developing instructive-document form information and outputting a before-written instructive document; extracting means for extracting analysis information for analyzing an after-written instructive document from the instructive-document form information; storing means for storing the extracted analysis information in association with form identification information attached to the instructive document already output; recognizing means for recognizing the form identification information of the after-written instructive document received; and analyzing means for analyzing the information on the received after-written instructive document while referring to the analysis information corresponding to the recognized form identification information, the analysis information being read out from the storing means, wherein the input device receives the information on the after-written instructive document, and inputs information obtained by the process of analyzing the received information to the information processing system.

According to a fourth aspect of the invention, there is provided an input method for an information processing system for carrying out a process on the basis of input data, the input method comprising: an output procedure for developing instructive-document form information and outputting a before-written instructive document; an extracting procedure for extracting analysis information for analyzing an after-written instructive document from the instructive-document form information; a storing procedure for storing in storing means the extracted analysis information in association with form identification information attached to the instructive document already output; a recognizing procedure for recognizing the form identification information of the after-written instructive document received; and an analyzing procedure for analyzing the information on the received after-written instructive document while referring to the analysis information corresponding to the recognized form identification information, the analysis information being read out from the storing means, wherein the input device receives the information on the after-written instructive document, and inputs information obtained by the process of analyzing the received information to the information processing system.

According to a fifth aspect of the invention, there is provided an input device for an information processing system for carrying out a process on the basis of input data, the input device comprising: output means for developing instructive-document form information and outputting an instructive document to which an edit is not yet made by a user (referred to as a before-edited instructive document); extracting means for extracting analysis information for analyzing an instructive document to which an edit has been made by the user (referred to as an after-edited instructive document) from the instructive-document form information; storing means for storing the extracted analysis information; and analyzing means for analyzing the information on the after-edited instructive document received while referring to the analysis information, wherein the input device receives the information on the after-edited instructive document, and inputs information obtained by the process of analyzing the received information to the information processing system.

According to a sixth aspect of the invention, there is provided an input device for an information processing system for carrying out a process on the basis of input data, the input device comprising: an output procedure for developing instructive-document form information and outputting a before-edited instructive document; an extracting procedure for extracting analysis information for analyzing an after-edited instructive document from the instructive-document form information; a storing procedure for storing the extracted analysis information; and an analyzing procedure for analyzing the information on the after-edited instructive document received while referring to the analysis information, wherein the input device receives the information on the after-edited instructive document, and inputs information obtained by the process of analyzing the received information to the information processing system.

According to a seventh aspect of the invention, there is provided an input device for an information processing system for carrying out a process on the basis of input data, the input device comprising: extracting means for extracting analysis information for analyzing an after-written instructive document from the instructive document information; form identification information generating means for generating form identification information for identifying the instructive document; storing means for storing the extracted analysis information in association with form identification information attached to the instructive document already output; output means for developing form information of an instructive document to be output on a request and outputting a before-written instructive document including the form identification information; recognizing means for recognizing the form identification information of the after-written instructive document received; analyzing means for analyzing the information on the received after-written instructive document while referring to the analysis information corresponding to the recognized form identification information, the analysis information being read out from the storing means, and for supplying the results of the analysis as input data to the information processing system; and form information generating means for generating form information of a new instructive document which shows the results of processing the received input data by the information processing system, wherein the respective means execute the processings of new form information in a new manner.

According to an eighth aspect of the invention, there is provided an input method for an information processing system for carrying out a process on the basis of input data, the input method comprising: an extracting procedure for extracting analysis information for analyzing an after-written instructive document from the instructive document information; a form identification information generating procedure for generating form identification information for identifying the instructive document; a storing procedure for storing the extracted analysis information in association with form identification information attached to the instructive document already output; an output procedure for developing form information of an instructive document to be output on a request and outputting a before-written instructive document including the form identification information; a recognizing procedure for recognizing the form identification information of the after-written instructive document received; an analyzing procedure for analyzing the information on the received after-written instructive document while referring to the analysis information corresponding to the recognized form identification information, the analysis information being read out from the storing procedure, and for supplying the results of the analysis as input data to the information processing system; and a form information generating procedure for generating form information of a new instructive document which shows the results of processing the received input data by the information processing system, wherein the respective procedures execute the processings of new form information in a new manner.

BRIEF DESCRIPTION OF THE DRAWINGS

The accompanying drawings, which are incorporated in and constitute a part of this specification, illustrate (an) embodiment(s) of the invention and, together with the description, serve to explain the objects, advantages and principles of the invention. In the drawings.

FIG. 3 is a diagram showing an-example of instructive-document form information described in a program language;

FIG. 4 is a diagram showing an example of analysis information described in a program language;

FIG. 7 is an explanatory diagram showing the inputting and outputting of a list of image data;

FIG. 8 is an explanatory diagram showing the outputting of the image data stored;

FIG. 11 is a diagram showing another instructive document output anew;

FIG. 22 is a diagram showing an example of an after-written instructive document to which entries are made;

FIG. 23 is a table showing the information on the items for image analysis;

FIG. 24 is a diagram showing an example of the language describing the information on the instructive document items shown in FIG. 23;

FIG. 29 is a diagram showing an example of a report document output in response to the print request instructive document transmitted;

FIG. 31 is a diagram showing the record structure of a file for totalizing the answers to the questions in the questionnaire;

DETAILED DESCRIPTION OF THE PREFERRED EMBODIMENTS

The embodiments of the present invention, which are believed to be preferred, will be described in detail with reference to the accompanying drawings.

Figure 2:
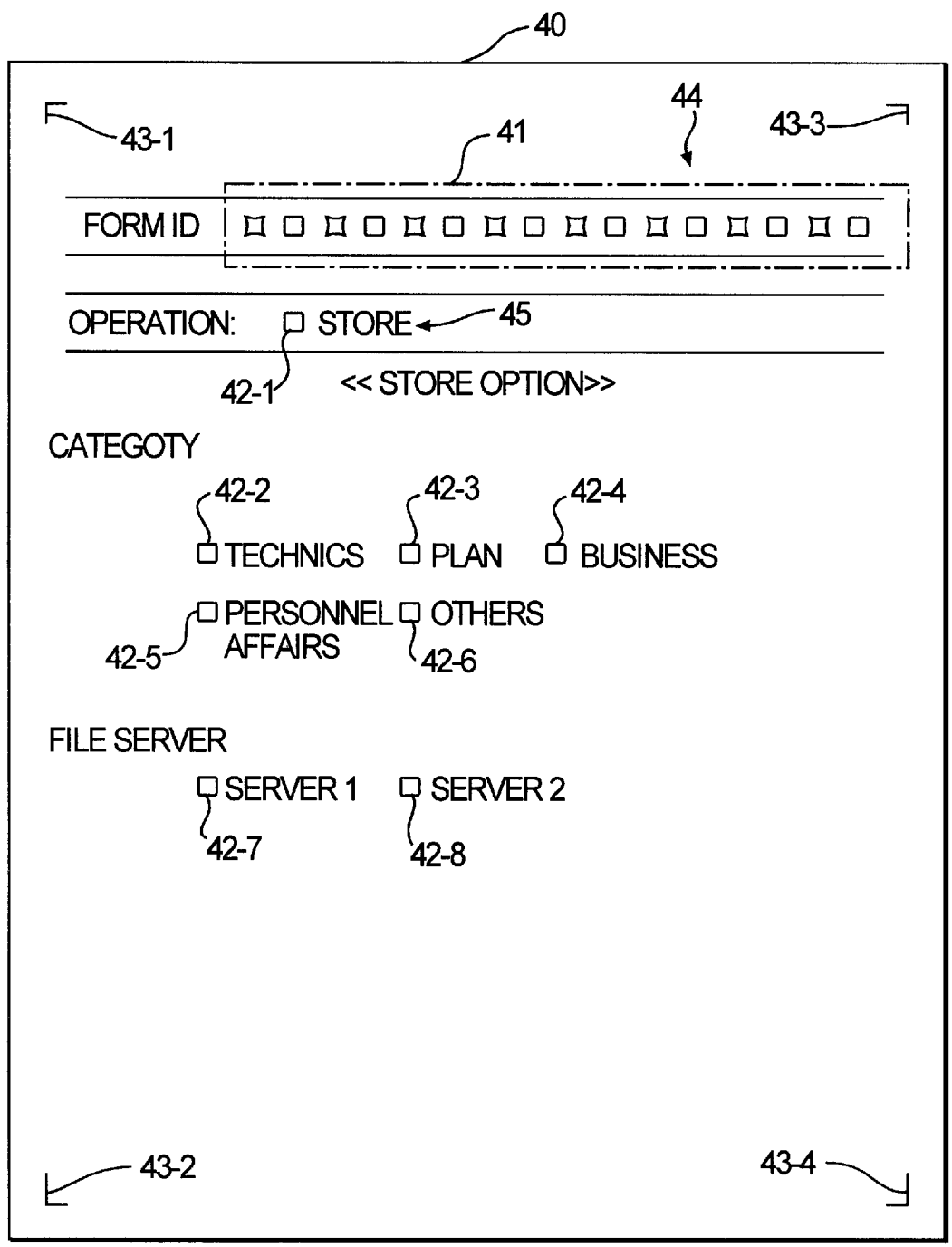
FIG. 2 is a plan view showing an example of a visual image of an instructive document.

Visual images (characters, graphics, and the like) of various instructive documents used in the applications, for example, a visual image of an instructive document shown in FIG. 2, are formed by a word processor, for example. The contents of the visual images are described in a page description language (PDL), for example. The contents of the visual image are stored as instructive-document form information in a hard disk.

In this specification, a conventional "mark sheet" is referred to as an "instructive document". The conventional mark sheet is limited in the layout thereon. On the other hand, the instructive document of the present invention is not limited in the layout. An explanation may be described in the instructive document. The word "document" is used for distinguishing the mark-sheet-like sheet of the invention from the conventional mark sheet.

Information, such as the definitions assigned to the check boxes, is added to the instructive-document form information representing the contents of the instructive document in a nonprintable form. Here, the "nonprintable form" involves arguments of macro instructions of the PDL, for example. The "definition" means various types of information (e.g., commands, character series, numerical values, and the like) to be transferred to the information processing system.

According to the first or second invention, when a user request the input device to output a before-written instructive document, the instructive-document form information on a designated instructive document is read out and developed into a visual image. The visual image is output by a designated facsimile (FAX), for example.

At this time, analysis information, such as the positions of check boxes, and the definitions assigned to the check boxes, are extracted from the instructive-document form information. The analysis information is used for analyzing the contents of the process carried out by the user, such as ticking-off of the check boxes.

To be more specific, the positions and size of the check boxes are extracted from the script part of the PDL. The definitions and the like are extracted from the arguments of micro instructions, comments, and the like. The extracted analysis information is stored into a hard disk or other storing means.

In a before-written instructive document that is output, for example, the instructive document shown in FIG. 2, the user ticks off the check boxes associated with "Store", "Technical", and "Server 1", and sends the before-written instructive document to the input device of the present invention by the FAX.

The contents of the instructive document received are analyzed while referring to the analysis information of the instructive document stored in the storing means.

In response to the ticking off the check marks of those items, the commands and characters assigned to the check boxes, for example, "command=store", "category= technology", and "server=#1", are supplied to the application.

The application carries out the process specified by those received commands, for example. As the result of carrying out the process, if there is a before-written instructive document to be output to the user, the application requests the input device of the invention to output the before-written instructive document.

In the third or fourth embodiment, when a before-written instructive document is output, form identification information managed in the input device is attached to the before-written instructive document. The same form identification information is also attached to the analysis information extracted from the instructive document form information.

Hereinafter, "form identification information" will be referred frequently to "form ID" or "FormID". The same thing is true for the description in the drawings.

When an after-written instructive document is received, the analysis information is read out according to the form identification information attached to the instructive document. The contents of the after-written instructive document are analyzed referring to the analysis information.

In the fifth or sixth invention, the contents of the instructive document are displayed on the screen of the display device in the work station. In this case, a mouse or a keyboard, in place of the writing tool, for example, a pencil, is used for ticking off the check boxes, and entering tick marks and characters in a character write-in area.

Thereafter, the user pushes the function key "End". The details of the edit that is performed on the screen are analyzed, and the definitions assigned to the check boxes are supplied as input data to the application.

Also in the seventh or eighth aspect of the invention, the before-written instructive document is managed using the form identification information. When the after-written instructive document is received, the contents of the instructive document are analyzed using the form identification information.

The results of the analysis are supplied as input data to the information processing system. In order to inform the user of the results of a given process responsively executed by the information processing system, the form information of another new instructive document is generated.

For the new form information, various processes, such as extraction of new analysis information, assignment of new form identification information, outputting of a new before-written instructive document by a FAX, for example, are carried out anew.

Figure 1:
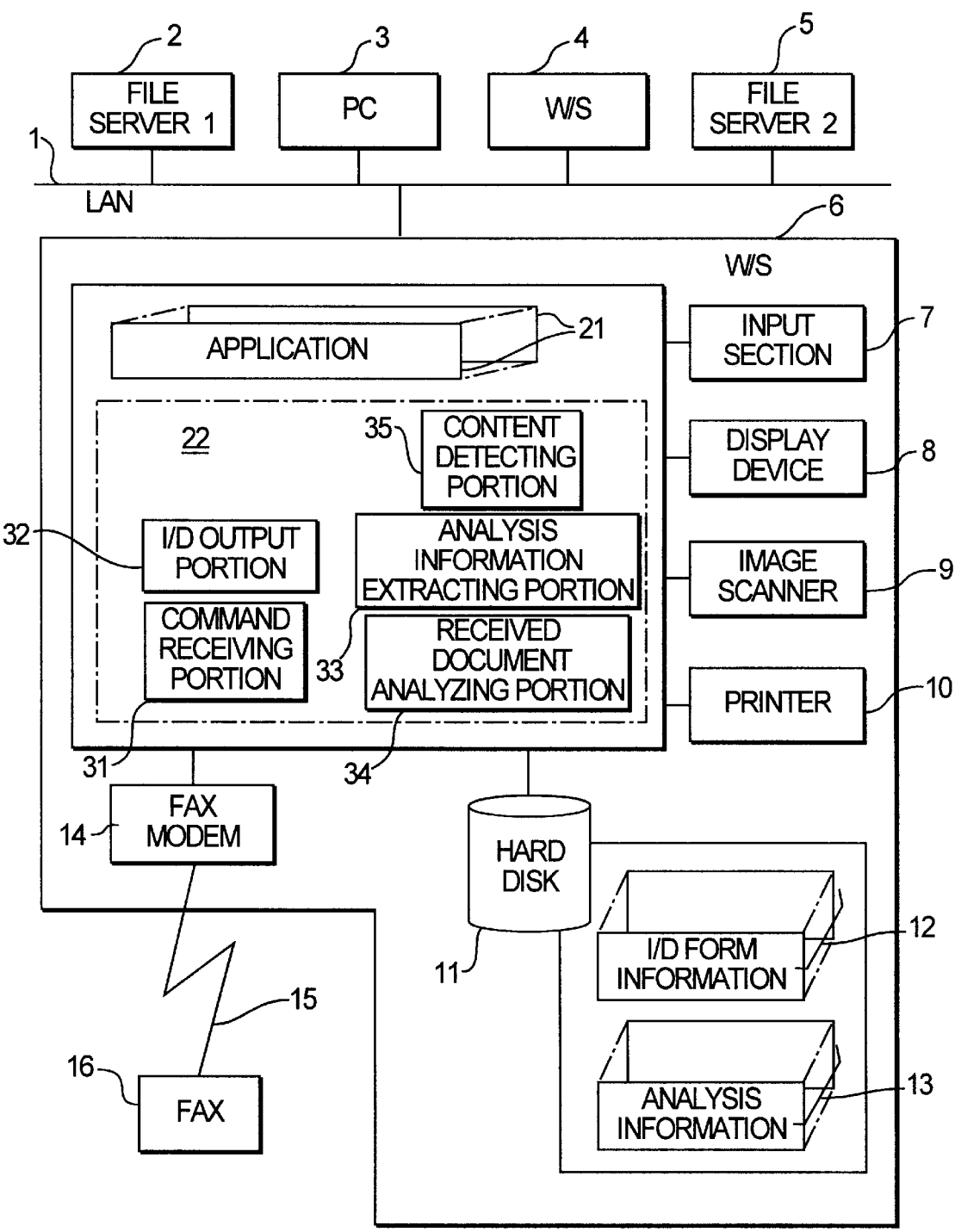
FIG. 1 is a block diagram showing the arrangement of an embodiment of the present invention.

The arrangement of the preferred embodiment of the present invention is illustrated in FIG. 1. In the figure, reference numeral 1 designates a LAN (local area network). Work stations (abbreviated as W/S in the figure) 4 and 6, a personal computer (abbreviated as PC in the figure) 3, a file server 1 and a file server 2 (designated by reference numerals 2 and 5), and others are interconnected through the LAN 1. Throughout the drawings, no reference symbols are attached to those portions that can be understood without reference symbols.

An input section 7 includes a full keyboard, a mouse, and the like. A display device 8 includes a CRT, a LCD, or the like. An image scanner 9 is used for inputting, by the local, an instructive document after checked by a user or in which characters have been written by the user (this document is referred to as an after-written instructive document).

A printer 10 is used in order that an instructive document before entries, such as tick marks and characters, are made by a user (this document is referred to as a before-written instructive document) is output from the work station 6 by the local. A hard disc 11 stores instructive-document (I/D) form information 12 and analysis information 13. Reference numeral 14 designates a FAX modem. A public network or an integrated services digital network (ISDN) is used for the transmission of FAX data between a facsimile (FAX) 16 and the work station 6.

The work station 6 includes an application 21 and an input/output control unit 22. The input/output control unit 22 includes a command receiving portion 31, an instructive document output portion 32, an analysis information extracting portion 33, a received document analyzing portion 34, and an edit content detecting portion 35.

The command receiving portion 31 audibly responds to a call which a user generates by operating push buttons of the FAX 16, the keys of the input section 7, or by clicking a mouse, receives the document number of an input instructive document, and sends the document number to the instructive document output portion 32.

The instructive document output portion 32 reads I/D form information 12 of a requested instructive document from the hard disc 11. Then, the instructive document output portion attaches form identification information to the I/D form information, and then develops it into a dot image (visual image).

The developed image data may be output in the form of an instructive document in which the user has ticked off the check boxes and written characters (referred to as an after-written instructive document) from the printer 10 or the FAX 16. It may also be displayed in the form of an image on the screen of the display device 8.

The analysis information extracting portion 33 extracts analysis information 13 from the I/D form information 12 output at this time. The same form identification information as that of the after-written instructive document is attached to the extracted analysis information 13, and stored into the hard disc 11.

A user ticks off check boxes and writes characters in the instructive document that is output from the FAX 16 or the printer 10. The instructive document having tick marks and characters thus written therein (viz., the after-written instructive document) is input through the FAX 16 or the image scanner 9.

The received document analyzing portion 34 detects form identification information from an identification pattern 41 (FIG. 2) of image data of this after-written instructive document. The analyzing portion reads analysis information 13 having the same form identification information as the detected form identification information, from the hard disc 11. The analyzing portion specifies the locations of check boxes 42 (FIG. 9) and a character write-in area 83 (FIG. 9) on the after-written instructive document input at that time, while referring to the analysis information 13. Throughout the drawings, the same symbols with different numerals attached thereto are used to individually designate the portions of the same names. For example, check boxes are designated by numerals 42-1 to 42-8.

The received document analyzing portion 34 checks whether or not tick marks are present in the check boxes 42 and reads out image data. The check is made on the basis of the locations of the check boxes 42 and character write-in area 83, specified.

The analyzing portions 34 reads the definitions of the check boxes with the tick marks written therein from the analysis information 13, and supplies the definitions as the input data of the after-written instructive document to the corresponding application.

With regard to a before-written instructive document output to and displayed by the display device 8, a user ticks off the check boxes and writes characters in the related locations on the displayed before-written instructive document (viz., edits a before-written instructive document) by operating the mouse or the keyboard in the input section 7.

This edit operation is performed using the work station 6. Accordingly, it is easy to detect the check boxes ticked by the user and the description in the character write-in area 83.

The edit content detecting portion 35 verifies this detection results in connection with the analysis information of the instructive document under process, stored in the hard disc 11. And the same supplies the definitions assigned thereto as the input data to the corresponding application.

An example of the before-written instructive document is illustrated in FIG. 2. In the figure, a before-written instructive document, designated by reference numeral 40, is generated for storing image data into an image data base (image filing system).

In the figure, registration marks 43-1 to 43-4 provide reference positions in the coordinates of the before-written instructive document 40. The registration marks 43 are used for correcting a distortion of the image data of an after-written instructive document that is input, and for detecting the locations of the check boxes 42-1 to 42-8.

Reference numeral 44 designates the title of the instructive document. In this instance of FIG. 2, the title is "Example of Format Paper". The identification pattern 41, located under the title 44, indicates form identification information attached to the instructive document.

The form identification information is attached to the instructive document by the instructive document output portion 32 when it is output from the FAX 16 or the printer 10. In the instant embodiment, the form identification information is expressed by hexadecimal four digits (16 bits). For ease of handling, it is preferable to assign a fixed range of numbers to the form identification information for each application. For example, "level of 1000" is assigned to the form identification information of the application 1, and "level of 2000", to the form identification information of the application 2, and so on. The form identification information may be expressed by bar codes, characters for OCR, and the like. In the instant embodiment, the form identification information is expressed by an identification pattern 41 titled as "Form ID". The identification pattern 41 consists of a series of black and white squares, which correspond to bits "0" and "1". In the identification pattern 41 shown in FIG. 2, black and white squares, alternately arrayed, are illustrated for ease of explanation. It is not intended that the black and white squares are arrayed so as to have a specific meaning.

Reference 45 indicates the contents of a process instructed by the before-written instructive document 40. In this instructive document, if the user ticks off the check box 42-1, the process instructed by the instructive document is "Store Process (image data storing process)".

The two verbal representations located under a caption <<Store Option>> indicate optional items (options) on the "Store" process. In this instructive document, two optional items may be selectively used, "Category" (classification) and "File Server" for storing image.

The layout of the before-written instructive document 40 is not limited to the illustrated one. This is one of the beneficial features of the present invention.

An example of the I/D form information 12, which is stored in the hard disc 11 (FIG. 1), is illustrated in FIG. 3.

In the figure, the I/D form information is designated by reference numeral 51. The I/D form information 51 describes the contents of the before-written instructive document 40 (FIG. 2), and is a visual image of the before-written instructive document 40.

The I/D form information 51 has the same nature as the document file handled in a normal word processor. Accordingly, the before-written instructive document 40 may be constructed by using the same type of software as that of the normal word processor or DTP.

Accordingly, the I/D form information 51 may be formed in the same procedure as to form a normal document on the screen of the display of the word processor or DTP. Then, to form a visual image, a user forms check boxes 42 at desired locations on the screen, and writes legends (e.g., "Technical", and "Planning") and subtitles (e.g., "CATEGORY" and "FILE SERVER") at the related locations by a full key. The document file thus formed is stored as a document file. The document file thus stored serves as the I/D form information.

In this case, it is convenient to define commands for the symbols and figures commonly used in the instructive document, such as registration marks 43 and check boxes 42 by using macro instructions.

Additionally, it is convenient that the check boxes 42 and the registration marks 43 are entered in such that a cursor is placed at a desired location on the screen, and set thereat by entering a command, for example, "check box".

The definitions assigned to the check boxes 42 are incorporated into the I/D form information 51. This may be realized by a conventional technique.

In the instructive document generator system constructed such that the check boxes are set by the command "check box", as in the case previously stated, the definitions are incorporated into the I/D form information 51 in such a manner that when receiving this command, the document generator displays a message, "Enter the definition", for example. In response to the message, the user enters data to the document generator. This data is assigned to the check box 42.

This definition, in connection with the ticked check box, is to be supplied as input data to the application, as mentioned above. Accordingly, the definition is different from the contents of the visual image for presenting the process contents to the user, such as "Technical" or "Planning" located near the check box 42. Those may be equal to each other, however, if required.

The definitions are incorporated, in the form of a comment, for example, into the I/D form information in a state that these are inhibited from being printed out on a paper.

In the instant embodiment, the data format (page description language) is Postscript (developed by Adobe corporation in U.S.A.). Another PDL (page description language), such as Interpress, HPGL, or PCL5, may be used for the data format. Additionally, it may be based on any data format of the word processor of its manufacturing company. The data format developed anew may be used, as a matter of course.

Further, in this embodiment, those items commonly used for different instructive documents, such as the registration marks 43, the identification pattern 41, and the check boxes 42, may be grouped into macro instructions, for example, "Registration mark", "FormID", and "Checkbox". The macro instructions are stored into a file "formlib.ps" of a directory "/usr/imgui/lib/ps".

The definitions assigned to the check boxes 42 are incorporated, in the form of augments of the macro instructions, into the I/D form information 12 (e.g., "CATEGORY", and "Technical" of the macro instruction "Check box" in FIG. 2).

(Structures of the macro instructions are omitted. These structures may easily be realized by combinations of commands defined by each language, if the details of the processes, or the visual images, such as the registration marks 43, the identification pattern 41, and the check boxes 42, are specified.)

An example of the analysis information 13 (FIG. 1) is shown in FIG. 4. In FIG. 4, the analysis information is designated by reference numeral 61. The analysis information 61 is that of the instructive document shown in FIG. 2. When the instructive document is output from the FAX 16, for example, the analysis information extracting portion 33 extracts the analysis information 61 from the analysis information extracting portion 33 (FIG. 3), attaches form identification data (Form ID=aaaa) to the extracted analysis information 61, and stores the result into the hard disc 11.

In the analysis information 61 shown in FIG. 4, proper analysis information is described in the fourth line and the subsequent ones. The parameters are arrayed in order using "^" as a separator. Specifically, the parameters are described in the order shown in the 2nd and 3rd lines in FIG. 4. The details of these parameter will be described in their order.

Figure 9:
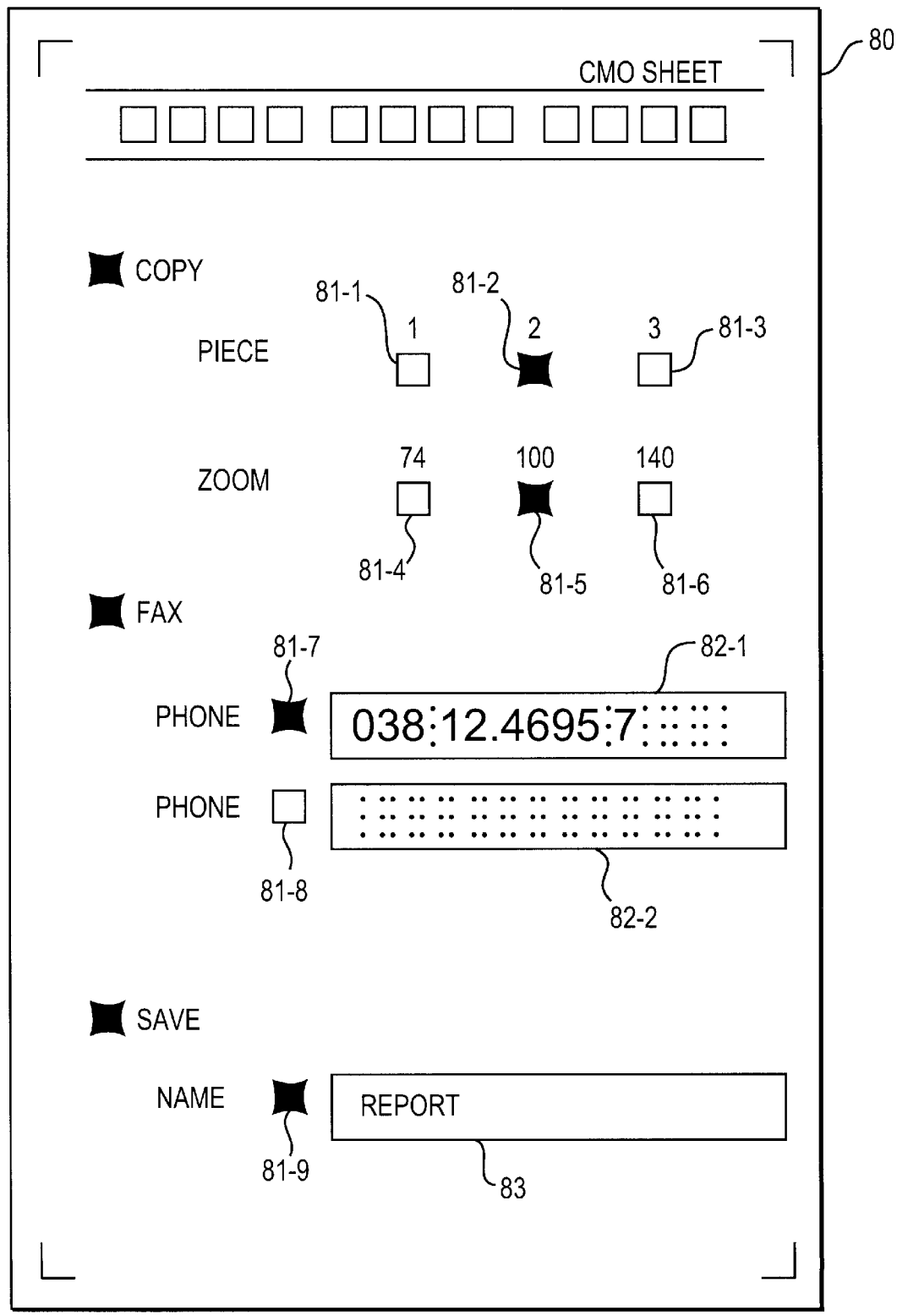
FIG. 9 is a plan view showing an example of a visual image of an instructive document.

"item" indicates the types of regional areas in which a user writes check symbols and characters. These areas are "check box", "numeral input area", "hand-writing image input area", and the like. These examples are illustrated in FIG. 9.

In the figure, reference numeral 81 designates "check box", which is designated by reference numeral 42. "CB" attached to the heads of the 4th line and the subsequent ones in FIG. 4 indicate the "check boxes". The instructive document illustrated here is an after-written instructive document, i.e., an instructive document to which a user has made entries. Accordingly, check boxes 81-2, 81-5, and others are painted black.

The "numeral input areas" are designated by reference numeral 82. As shown, groups each consisting of six dots are arrayed side by side. A user hand-writes the numerals of a FAX number, for example, in this area. To write, he connects dots of each group along a figure of each numeral, with a pen, for example. The written numerals are image analyzed, and the results are transferred as numerical data to the related application. In the analysis information, the numerical data is denoted as "NUM" (This is not illustrated in FIG. 4 since such an area is not used in the instructive document 40 in FIG. 1.). Characters and graphics written into an image form input area 83 are directly supplied to the application. In the application, image data may be used in various ways. In the instructive document shown in FIG. 9, for example, the title of image data to be stored in the data base is written in this area. In the analysis information 61, this information is expressed as "IMAGE" (In FIG. 4, it is not illustrated since such an area is not used in this instructive document unlike the before-written instructive document 40 of FIG. 2).

In the second line in FIG. 4, two parameters <x1> and <y1>, which follow <item>, indicate the coordinates (the absolute coordinates from an origin, expressed in points as the unit) of those user input areas 81, 82, and 83.

The instant embodiment employs the relative address resembling the tab, for ease of forming the instructive documents 40 and 80, for example. Further two parameters <x2> and <y2>, which follow the above two parameters, are used for expressing the positions of the user input areas 81, 82, and 83 in this relative address.

Additional parameters <x1> and <y1> indicate the magnitudes in the X and Y directions (unit : point) in the user input areas 81, 82, and 83. A parameter <func> represents the definition (command, name, etc.) assigned to the user input area. The next parameter <value> represents a value of this definition (augment).

Parameters <uid>, <pid>, and <gid> are used for the convenience of various processes in the application, and are defined as follows.

The parameter <uid> generally represents a unique identification which may take different values for identifying individual user input areas. In the example of FIG. 4, serial numbers "1" to "8" are assigned to the check boxes CB (which indicate the numbers 42-1 to 42-8 in FIG. 2) of the descriptions of the fourth line and the subsequent ones.

The parameter <pid> represents a parent identification. For a parent, a value "0" is written here, and for a child, the unique identification <uid> of the input area of its paren is written here.

In the example of FIG. 4, the check box CB (42-1 in FIG. 2) of the fourth line is a parent. The check boxes CB (42-3 to 42-8 in FIG. 2) on the fifth line and the subsequent ones are the children of the 4th line check box CB.

The parameter <gid> indicates a group identification. The same numeral is assigned to the user input areas belonging to a group. In the example of FIG. 4, the same numeral "1" is assigned to the user input ares of the fifth to ninth lines (42-2 to 42-6 in FIG. 2), and the same numeral "0", to the user input areas of the tenth and eleventh lines (42-7 to 42-8 in FIG. 2).

The overall operation of the input device for the information processing system will be described particularly with reference to FIGS. 5 to 8. In the operation description to follow, the input device makes an access to a data base DB, remotely located, through the FAX 16, by using an instructive document of the present invention.

The data base DB shown in FIGS. 5 to 8 is realized by the work station 6 (FIG. 1), and includes the input device (the input/output control unit 22, the hard disc 11, and the devices connected to the input/output control unit 22) of the present invention.

(a) A user calls the data base DB by using the FAX 16 (FIG. 1) (request of a before-written instructive document 71). In response to the call, the command receiving portion 31 sends a sound message (for example, "This is a patent image data base. Please enter your code number and an instructive document number.") to the FAX 16.

(b) In response to the message, the user enters a prestored code number and the number assigned to a before-written instructive document 91 used for storing image data by the DTMF (dual tone multi frequency) of a button of the push-phone (request of a before-written instructive document 71).

To be more specific, it is assumed that a number "1" is assigned to the instructive document 91, and a code number is "xxxx". Then, the user enters "1" and "xxxx". In this case, a separator "#" is placed between them.

(c) The command receiving portion 31 supplies the input data to the instructive document output portion 32. In response to this, the instructive document output portion 32 reads the I/D form information 12 for storing image data from the hard disc 11, and attaches form identification information IDn1 to the readout I/D form information 12.

A fixed range of numbers is assigned to the form identification information for each application, as described above. For example, the number of the "level of 1000" is assigned to the form identification information for image data store; the number of the "level of 2000", to the form identification information for image data request; and the number of the "level of 3000", to the form identification information for image retrieval.

(d) The instructive document output portion 32 substitutes this form identification information for a variable <aaaa> (of the 14th line in the example of FIG. 3) of the I/D form information 12, and develops the I/D form information for image data storing into a visual image. The variable <aaaa> is used as the augment of the micro instruction "FormID". The identification pattern 41 (FIG. 2) is generated under control of this macro instruction.

Figure 5:
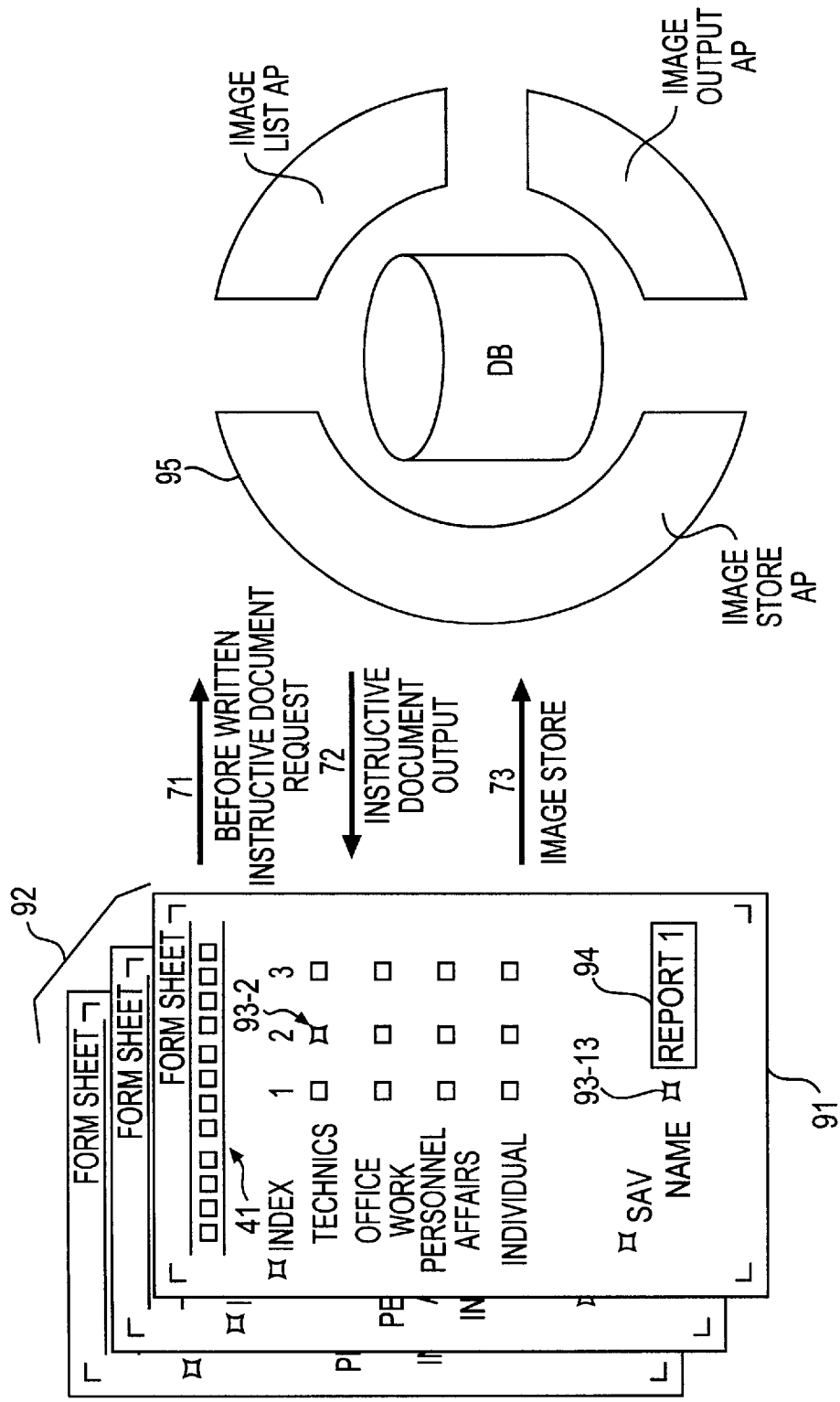
FIG. 5 is an explanatory diagram showing the storing procedure of image data.
Figure 6:
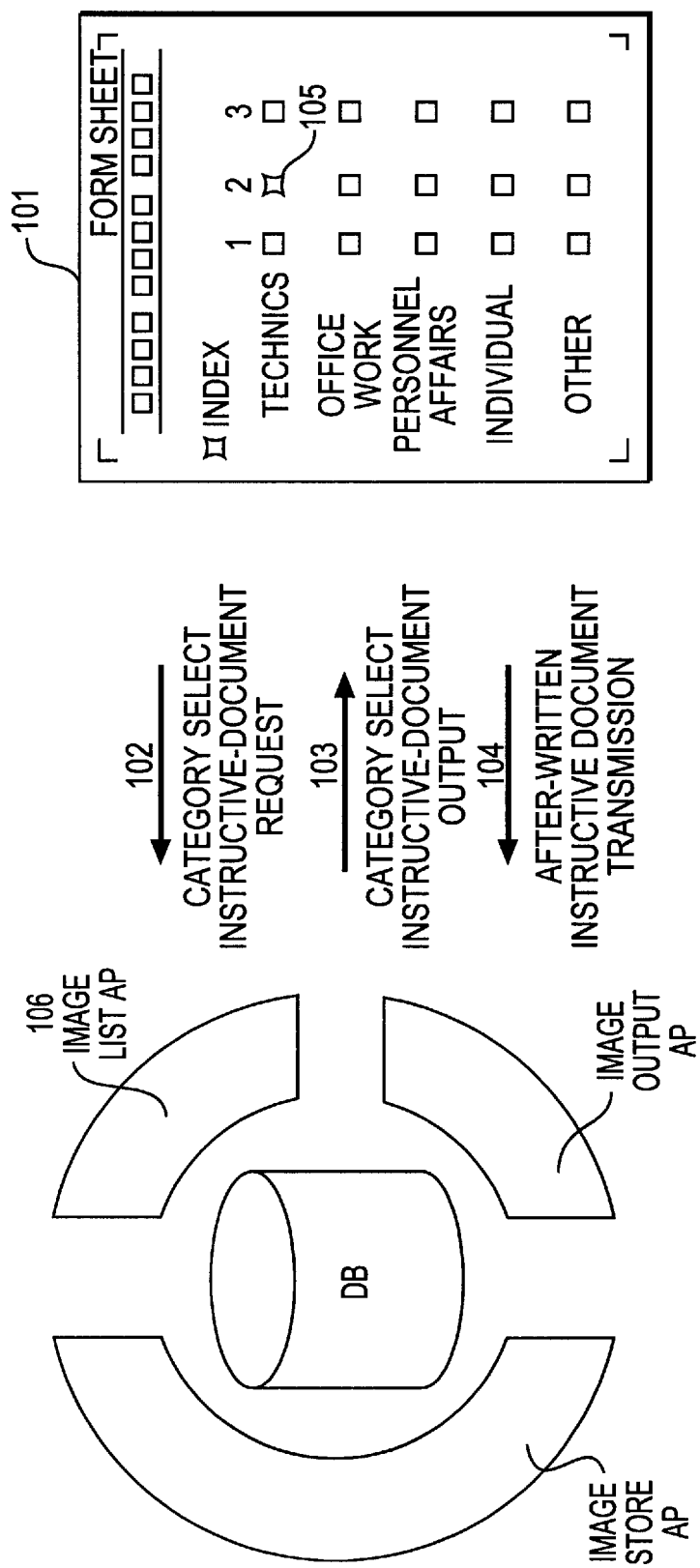
FIG. 6 is an explanatory diagram showing the inputting and outputting of an instructive document for designating a category.

(e) The generated image data is supplied through the FAX modem 14 to the FAX 16, and output as the instructive document 91 from the FAX 16 (instructive document output 72). Check boxes 93 and a character written-in area 94 in the instructive document 91 are empty immediately after it is output. In FIG. 5, some of these check boxes are painted out black and characters are written in the character written-in area, for showing a state of the instructive document after it is created by a user. In the figure, the before-written instructive document and the after-written instructive document are both indicated by the same reference numeral 91. The same thing is correspondingly applied to the remaining drawings.

The analysis information extracting portion 33 extracts analysis information 13 from the I/D form information 12 of this document, assigns the same identification number IDn1 to the analysis information 13, and stores the result into the hard disc 11.

(f) In this instance of the embodiment, image data (documents) 92 are stored as "NAME =Report 1" in the category of "INDEX=Technical 2" in the data base DB. To this end, a user paints out black the check box 93-2 (Technical 2) in "INDEX" and the check box 93-13 in "NAME", and writes "Report 1" in the character written-in area 94.

(g) After thus written, the instructive document 91 is laid over the image data 92 to be stored and transmitted by the FAX 16.

(h) The received document analyzing portion 34 checks whether or not the image data of the instructive document (the information of the after-written instructive document) contains an identification pattern 41. If the pattern is present, the instructive document contains some instructions. Then, the document analyzing portion checks the allocations of the painted or checked squares to specify the form identification information.

Here, the form identification information is the form identification information IDn1. The received document analyzing portion 34 reads the analysis information 13 with the form identification information IDn1 attached thereto from the hard disc 11. The received document analyzing portion 34 analyzes the image data of the input instructive document 91, thereby to find the checked check box 93.

(i) The definition of the checked check box 93 is read out of the analysis information 13. If the check box "NAME" is checked, the image data in the character written-in area 94 is read out.

(j) The received document analyzing portion 34 supplies the readout data as input data to an image store application 95.

(k) The image store application 95 carries out a process instructed by the input data. In this instance, "Image data store process" is instructed by the instructive document 91.

The image store application 95 receives the image data 92, which follows the instructive document 91, and stores the received image data and the image data of the check boxes 93 as well into the category of "Technical 2" in the memory device of the data base DB. The memory device of the data base DB may be the hard disc 11, the file server 1 (designated by reference numeral 2) and another filer server 2 (designated by reference numeral 5), which are shown in FIG. 1, and the like.

The file name for storing the image data into the memory device is limited in its length. The image data of "Report 1" written into the character written-in area 94 is usually considerably large. Therefore, it is improper to use it as the file name.

The image stored application 95 names the file of the image data to be stored into the memory device of the data base DB according to its own rule. It is named as "REPORT 1. IMG", for example.

(l) If the data coming from the FAX 16 contains an error (for example, the order and/or the contents of the image data are incorrect), the received document analyzing portion 34 carries out a given error process. If the instructive document that first arrives or the image data that follows the instructive document is absent, the received document analyzing portion 34 produces an error message "Input order is incorrect". This message is output on the receiving sheet of the FAX 16.

The stored image data is read out in the following procedure.

(a) Request of an instructive document for category designation 101:

As in the image data storing process, a user calls the data base DB, and enters his identification number and the number assigned to the category-designation instructive document 101, for example, "2" (category select I/D request 102).

(b) The command receiving portion 31 supplies the input data to the instructive document output portion 32. In response to this, the instructive document output portion 32 reads the I/D form information 12 for the category-designation instructive document 101, from the hard disc 11, and attaches an identification number IDn2 (not yet used) of the level of 1000 to the I/D form information 12.

(c) The instructive document output portion 32 substitutes the identification number IDn2 for the variable <aaaa> of the I/D form information 12 of the category-designation instructive document 101, and develops it into a visual image.

(d) The generated visual image is transferred to the FAX 16, through the FAX modem 14, and output in the form of a category-designation instructive document 101 (category select I/D output 103).

The analysis information extracting portion 33 extracts analysis information 13 from the I/D form information 12 of the output category-designation instructive document 101, and then stores it into the hard disc 11.

In this instance, the image data 92 of the "NAME=report 1" as in the previous case is read out. The image data 92 is stored in the category of "INDEX=Technical 2". A user checks a check box 105 of "Technical 2" in "INDEX" of the category-designation instructive document 101, and transmits the checked category-designation instructive document 101 by the FAX 16 (after-written instructive document transmission 104).

(f) The received document analyzing portion 34, as in the case of storing the image data, checks whether or not the received image data contains an identification pattern 41. If it contains the identification pattern 41, the image data is representative of an instructive document. Then, the document analyzing portion 34 checks the allocations of the checked squares to specify the identification number IDn2.

The received document analyzing portion 34 reads the analysis information 13 with the identification number IDn2 attached thereto from the hard disc 11. On the basis of the readout analysis information 13, the received document analyzing portion 34 specifies the checked check box 105 and reads out the definition assigned to the check box, as in the case of the image data storing.

(g) In the definition, a list 111 of the image data stored in "Technical 2" is requested (FIG. 7). The received document analyzing portion 34 supplies a command of the list request as input data to an image list application 106.

(h) The image list application 106 executes the process indicated by the input data. As for the image data stored in the category "Technical 2", the image list application 106 reads the image data that has been written in the character write-in area 94, from the data base DB, and supplies the readout image data to the instructive document output portion 32, whereby the outputting of an instructive document for the image data list 111 is requested.

(i) The instructive document output portion 32 reads the I/D form information 12 on the instructive document for the image data list 111, from the hard disc 11, and attaches an empty identification number IDn3 of the level of 3000 to the readout I/D form information. To this end, the instructive document output portion 32 substitutes the identification number IDn3 for a variable <aaaa> of the I/D form information 12.

The instructive document output portion 32 develops the I/D form information 12 into visual images, and causes the image data that have been written in the character write-in areas 94 to display them in image output areas 112-1 to 112-8. When the image data is great in number, the page number is correspondingly increased.

(j) The generated visual image is transferred through the FAX modem 14 to the FAX 16. Thus, the image data list 111 is output (image data output 121).

The analysis information extracting portion 33 extracts the analysis information 13 from the I/D form information 12 of the instructive document for the image data list 111, attaches the identification number IDn3 to the analysis information 13, and stores it to the hard disc 11. The analysis information for the check boxes 113-1 to 113-8 are the file names that are given to the files of the image data by the image data store application 95 when the data are stored.

(k) In this instance, the documents 92 of "NAME=Report 1" are read out as recalled. A user paints out the check box 112-5 of "NAME=Report 1" in the image list instructive document B161, and transmits it by the FAX 16 (transmission of the after-written instructive document 122 in FIG. 7).

(l) The received document analyzing portion 34 checks whether or not the received image data contains an identification pattern 41, as in the image data storing. If it contains the identification pattern, the image data represents an instructive document. Then, the document analyzing portion 34 checks the allocations of the checked squares to specify the identification number IDn3.

The received document analyzing portion 34 reads the analysis information 13 with the identification number IDn3 attached thereto from the hard disc 11. On the basis of the readout analysis information 13, the received document analyzing portion 34 specifies the checked check box 113-5 and reads out the definition assigned to the check box, as in the image data storing.

(m) The definition "File output of REPORT. IMG" is assigned to the check box 113-5. The received document analyzing portion 34 supplies the file name as input data to an image output application 107.

(n) The image output application 107 executes the process indicated by the input data (image data output 131 in FIG. 8).

In the description thus made, the FAX 16 was used for inputting and outputting of the instructive document (40, 80, etc.). If required, the image scanner 9 or the printer 10 may be used in place of the FAX 16. The combination of these devices may also be used for the same purposes. For example, a before-written instructive document (40, 80, etc.) is printed out by the printer 10. A user carries the before-written instructive document to another place and inputs it by a FAX located in that place.

The inputting and outputting of the instructive document may be carried out in a paperless manner. This follows.

The contents of an instructive document (40, 80, etc.) are displayed by the display device, such as the display device 8 of the work station 6 where the data base DB is operating, the display device (not shown) of another work station 4 connected to the LAN1, or the display device (not shown) of the personal computer 3 connected to the same.

Tick marks and characters are written in the displayed instructive document by the related input section 7 in such a manner as to edit the instructive document form information.

The edit contents are supplied to the edit contents detecting portion 35, and processed for analysis as when receiving the edit contents through the FAX.

This paperless inputting/outputting process of the instructive document is expressed by the wording "to process information on an instructive document form and to add instructions to the processed information" in claims 5 and 6.

As a matter of course, the paperless inputting/outputting process using the display device 8 and the inputting/outputting process using the paper may be combined.

An automatic generation of an instructive document will be described. In the description to follow, the present invention is applied to an input/output section of a file system (the file system=a system for retrieving, storing, and listing files). Further, in the description, a process where the files stored are retrieved is handled by way of example. To this process, an instructive document for requesting the display (list) of a directory in a file system is input by the image input device (e.g., FAX 16, image scanner 9 or the like (FIG. 1)).

The input/output control unit 22 analyzes the instructive document through an image processing, makes an access to the file system, and gets the directory requested by a user from file system.

The embodiment system generates a new instructive document on the basis of the contents of the list, and outputs the instructive document 141 from a specified output device (FAX 16 or printer 10).

Figure 10:
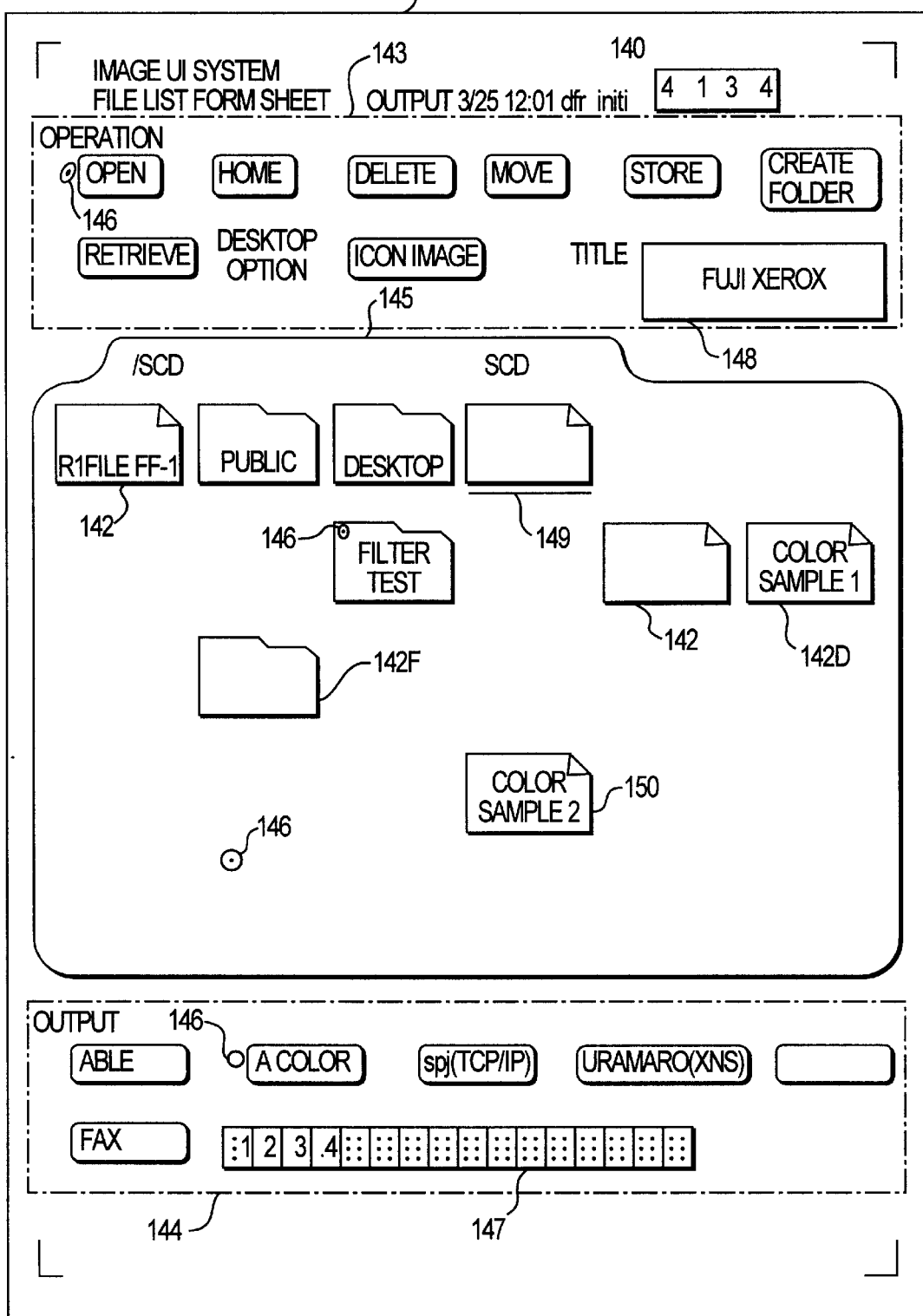
FIG. 10 is a diagram showing an instructive document output anew.
Figure 11:
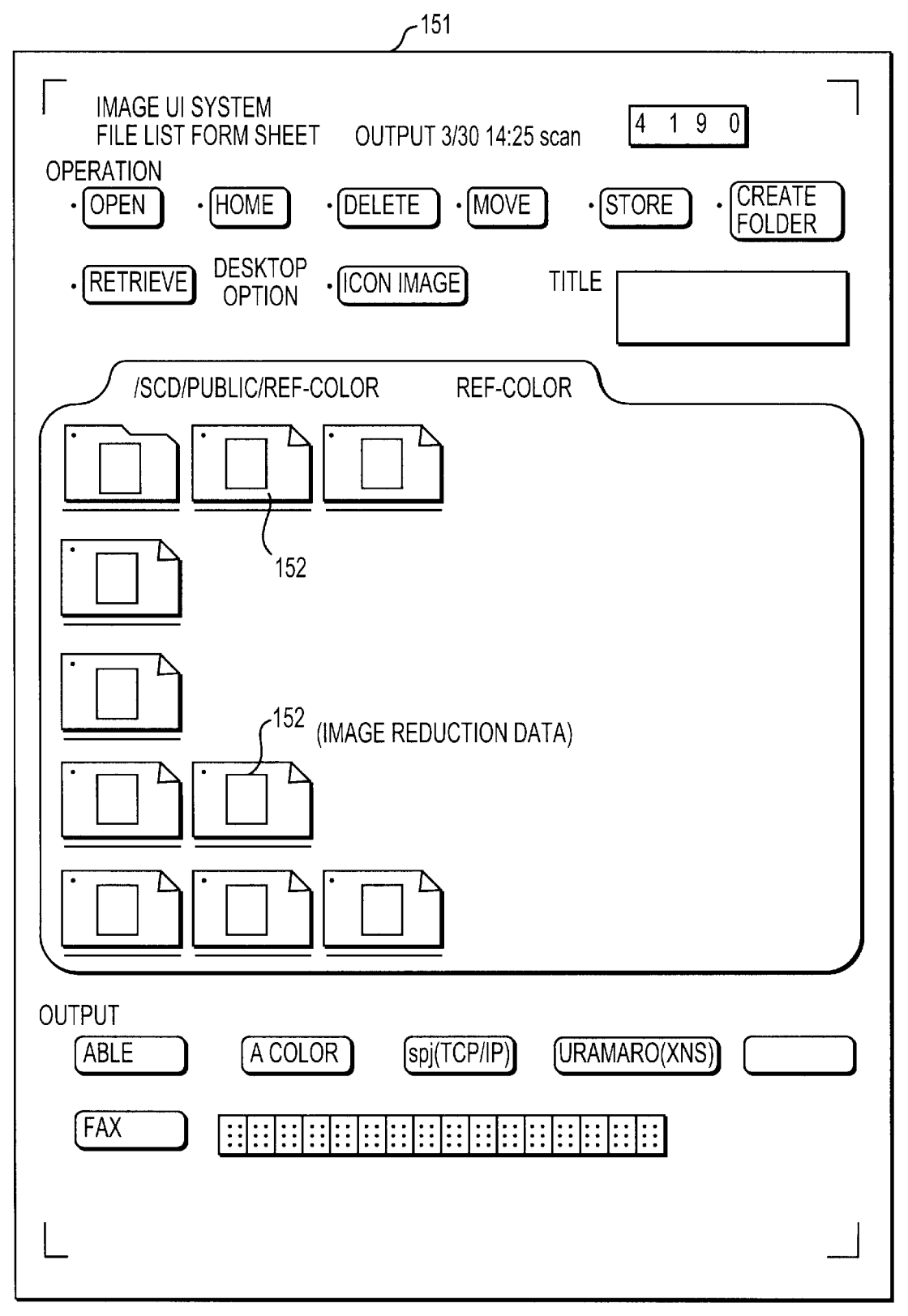

Examples of instructive documents 141 and 151 output anew are shown in FIGS. 10 and 11 (these instructive documents are each labelled as File List Form Sheet in the figures). These instructive documents are different only in the display contents of icons 142 and 152. Therefore, the instructive document 141 is typically described.

The icons generally indicate those displayed on the screen of the display device. In the present specification, the icons involve the icons printed out on a paper or an instructive document and those displayed on the display screen.

The instructive document 141 includes a check area 143 for designating the details of an operation (process), another check area 144 for designating a destination, and an area for a desktop display 145 for displaying the results of the list-up.

Icons 142, which represent the files stored in the file system, are displayed in the desktop display 145 (reference numeral 142 are attached to only some of those icons, for simplicity). Each of these icons 142 is two-dimensionally expressed by X and Y coordinates. The coordinates values are stored in the form of the attributes of the files in the file system.

A user may continue another desired process (e.g., retrieve, file open, or the like) on the files in the file system on the displayed instructive document 141, by designating the icon 142 two-dimensionally expressed.

In the desktop display 145, reference numeral 142D designates an icon representative of a document; 142F, an icon representative of a folder; 146, an example of a check made by a user; 147, a write-in area in which the FAX number of a destination is written; 148, an area in which a title is written by hand when a file is stored; 149, a reference; 150, an example of a title image when it is input by the handwriting.

Figure 12:
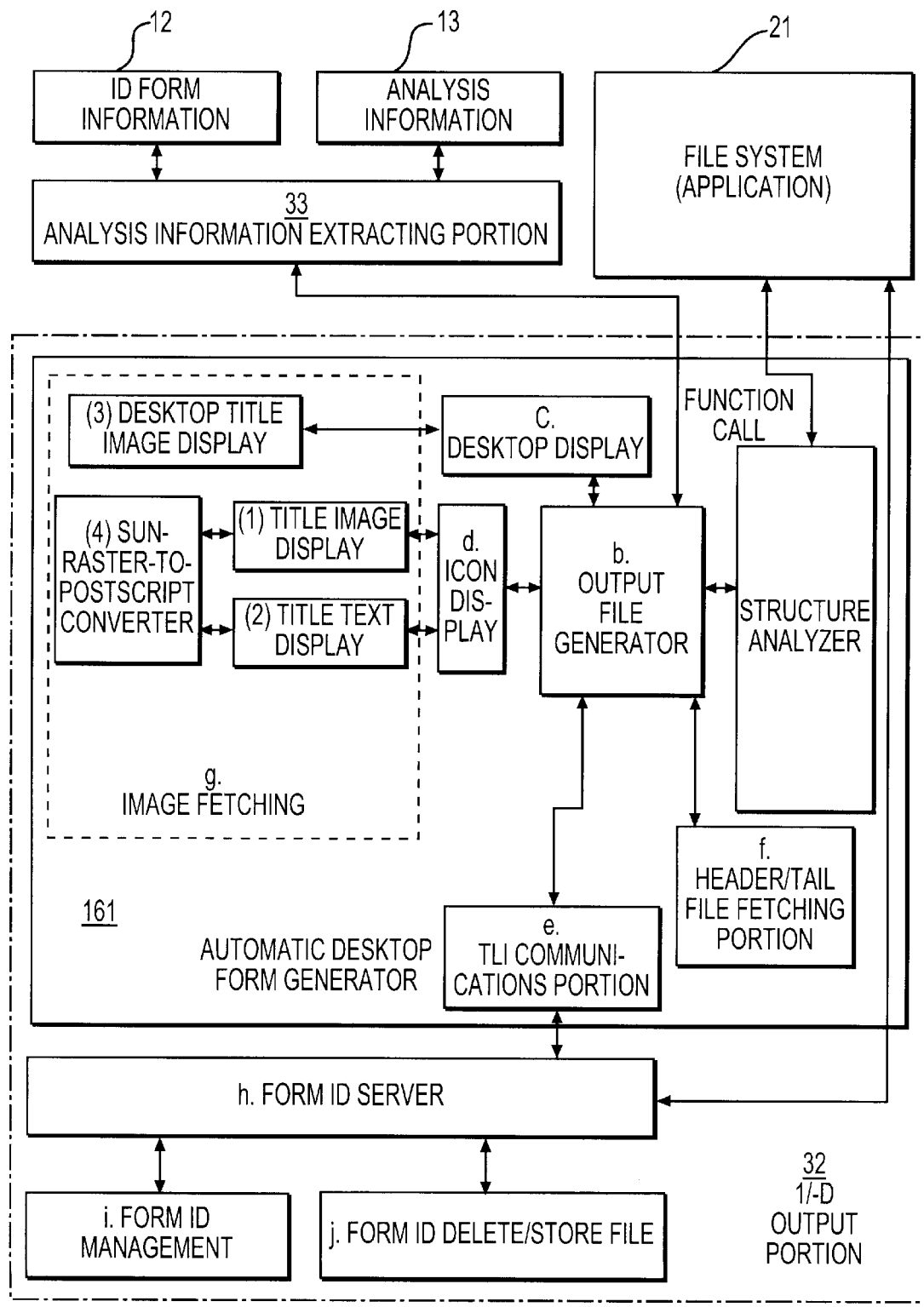
FIG. 12 is a block diagram showing the arrangement of a system for automatically generating an instructive document.

FIG. 12 is a block diagram showing the arrangement of an automatic instructive-document generating system for generating an instructive document (141, 151, or the like). In FIG. 12, like reference numerals are used for designating like or equivalent portions in FIG. 1. The details of the automatic instructive-document generating system will be described.

a) Structure analyzer

A structure analyzer a analyzes the results of the list-up made by the file system (the details of a directory requested by the user) for the purpose of automatically generating an instructive document.

b) Output file generator b

The contents of the instructive document 141 (or 151) are output in the form of a file described in terms of a PDL. An output file generator b generates the output file. Specifically, the output file generator b reads a header file and a tailer file. Further, the output file generator b incorporates thereinto a new form ID that is gained from a form ID server h (This is displayed as a form ID 140 in the instructive document 141.).

c) Desktop display

The description in the PDL is incorporated into the output file for displaying the desktop display 145. A total of 30 icons, five icons in column and six icons in row, may be displayed in the desktop display 145.

The details of the directory requested by the user, as shown, are displayed in the form of characters or images in the desktop display 145.

d) Icon display

The icons 142 are displayed in the desktop display 145. The shapes of the icons 142 are changed according to the attributes of the files. A file name is expressed in the form of a character train or an image. The file name expressed by a character train is called "title text", and the file name by an image is called "title image".

A TLI communication portion e (transport layer interface) sets up a connection with the form ID server to gain a new form ID.

f) Header/tail fetching portion

A header/tailer fetching portion f reads a header file and a tailer file for the output file.

g) Image fetching portion (1) Title image display

A title image display (1) displays the file name (if used) of an icon in the form of a title image. In this instance, the tile image is stored as the attribute of the file when it is stored into the file system.

(2) Title text display

If the title image is absent in the title image display (1), the title text is processed for display in this title text display (2). In this instance, the title text, when its file is stored, is also stored as the attribute thereof.

(3) Desktop title image display

If the tile image is contained in the desktop display c, it is processed for display in this desktop title image display (3).

(4) SunRaster-to-PostScript converter

The image file (SunRaster) of a bit map is converted into PostScript.

h) Form ID server

The form ID server h searches an form ID management file i to gain a new form ID.

An automatic desktop form generator 161 thus formed receives the information (list) on the directory requested by the user from the file system (application) 21, and analyzes the list information. The generator considers the directory as the disk top, and gives the file name of the directory to the disk top. The file contained in the directory is represented by an icon in the desktop display 145, as already described.

The name ("SCD" in the figure) of the desktop display 145, the title image, title text, the X and Y coordinates, and the like are stored as the attributes thereof in the file system when the files are stored in the file system, and those are incorporated into the desktop display 145.

Figure 13:
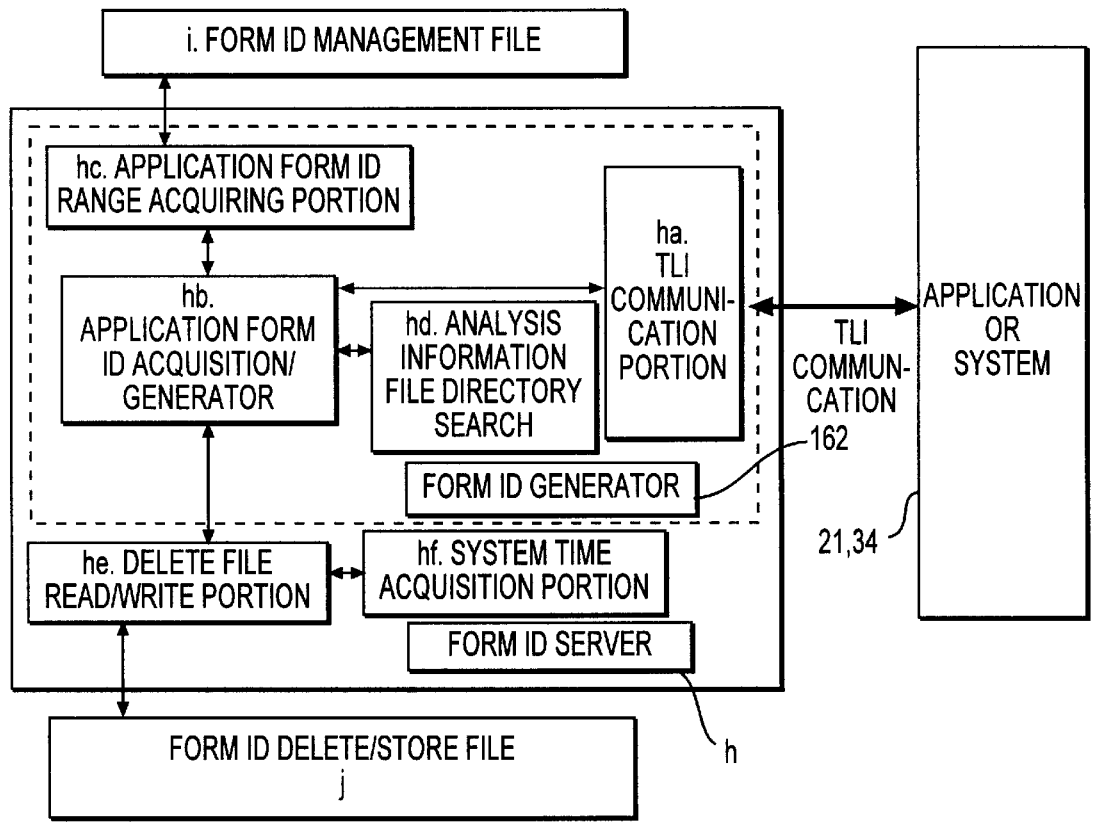
FIG. 13 is a diagram showing the details of a form ID server in the automatic instructive-document generating system of FIG. 12.

The details of the form ID server h shown in FIG. 12 are illustrated in FIG. 13. The form IDs of the instructive documents are managed enbloc by the form ID server h. The form ID server h has the following functions.

<Function 1>

To assign a form ID, not used, to a new instructive document.

<Function 2>

To specify the form ID in the application 21, which corresponds to a form ID that is obtained through an image analysis of an after-written instructive document that is input, and to return the result to the system (received document analyzing portion 34). With this function, the system (input/output control unit 22) can manage the instructive documents enbloc by the form ID in the application.

<Function 3>

To assign the form ID set within a preset range to each application. This range can be altered dynamically (by rewriting the form ID management file).

<Function 4>

To manage the analysis information files associated with the instructive documents in one-to-one corresponding manner. When a preset time is reached, this server deletes the analysis information files. As a result, the form IDs for the deleted analysis information files may be used again.

The respective portions of the form ID server h shown in FIG. 13 will be described in detail.

(1) Form ID generator 162 ha) TLI communication portion

A TLI communication portion ha is for communicating with the application 21 and the system. The TLI (transport layer interface) is used for the communication.

hb) Application form ID acquisition/generator

An application form ID acquisition/generator hb generates a form ID or the application name to be returned on the basis of information fetched from the form ID management file i and an analysis information file directory search portion hd.

hc) Application form ID range acquiring portion

An application form ID range acquiring portion hc searches the form ID management file i for information on the application form ID range.

hd) Analysis information file directory search portion

An analysis information file directory search portion hd searches the directory storing the analysis information files for the form IDs already used.

he) Delete file read/write portion

A delete file read/write portion he stores the analysis information file to be deleted in a form ID delete/store file j and retrieves the same at fixed time intervals, in order to delete an analysis information file. The delete time and the retrieve time may be designated in the steps of a second.

hf) System time acquisition portion

A system time acquisition portion hf acquires a system time for the delete file read/write portion he.

(2) Form ID management file i

In the form ID management file, the application names and the ranges of the form IDs that can be used by the application are mapped. The form ID management file i is for acquiring a range of the form ID that can be used. The range of the form ID to be assigned may be changed by rewriting this file. Therefore, when the range of the form ID is changed, there is no need of altering the system. The details of the file are as follows:

| AP_SAVE | 0001 | 0001 |
| AP_LIST | 0002 | 0002 |
| AP_RETDEL | 1000 | 1500 |
| AP_S21 | 2000 | 2999 |
| AP_DFR RETEDK | 3000 | 3200 |
| AP_DESKTOP | 4000 | 4999 |

In the above files, the character series indicates the application name, and the range of the form ID used by the application is defined by a first group of numerals (minimum value) and a second group of numerals (maximum value).

The form ID server h acquires the form ID from this form ID management file and returns any of the following values to the application.

| Returned values | Conditions |
| --- | --- |
| 1) Minimum value | min. = max. |
| 2) Minimum value | min. > max. |
| 3) Null | min. ≦ 0 |
| 4) Null | max. ≧ 9999 |

Note)
min. = minimum value, and max. = maximum value

In a condition other than the above ones, viz., a normal state, the form ID server h searches the analysis information file management directory, and returns an ID form, not used, having the smallest difference between the maximum and the minimum values to the application.

When the form IDs within the ranges specified by the form ID management file are all used, the form ID server h continues the return of the maximum value within that range.

(3) Form ID delete/store file j

The analysis information files to be deleted and the delete time are stored in this file. The delete time can be designated in the steps of a second.

The operation of the form ID server h in connection with the "function 1" will be described.

When the application 21 outputs the result of its process in the form of a new instructive document, the application sends the name of the application per se to the form ID server h.

The form ID server h searches the form ID management file i for the application name, and acquires the range of the form ID. The form ID server h searches the directory storing the analysis information files for a form ID not used at that time. The form ID server h returns a form ID which is other than the form IDs now used, and the smallest form ID within the range of the form ID, to the application. Information to delete the analysis information file corresponding to the form ID after a designated time is stored in the form ID delete/store file j. The range of the form ID may be dynamically changed independently of the system.

The operation of the form ID server h in connection with the "function 2" will be described.

When an instructive document is input to the system (input/output control unit 22), the system carries out an image process, thereby obtaining the form ID of the instructive document. The system sends a form ID to the form ID server h.

The form ID server h searches the form ID management file i for the application name of the form ID, and returns the application name to the system. The system boots the application of that name.

The operation of the form ID server h in connection with the "function 3" will be described. The mapping of the form IDs and the application names are described in the form ID management file i. The form ID server h refers to this file. Therefore, the mapping of the ranges of the form IDs and the application names may be dynamically changed by rewriting the file.

The operation of the form ID server h in connection with the "function 4" will be described.

The form ID server h searches the form ID delete/store file i at fixed time intervals in order to delete the analysis information file that is stored by the "function 1". When the form ID has been stored therein after a preset time, the form ID server h deletes the analysis information file of the form ID. As a result, the form ID is used again when another instructive document is output.

One of the preferable managing ways is to systematically manage all of the form IDs used in the input device which operates on each device connected to the LAN1.

Figure 14:
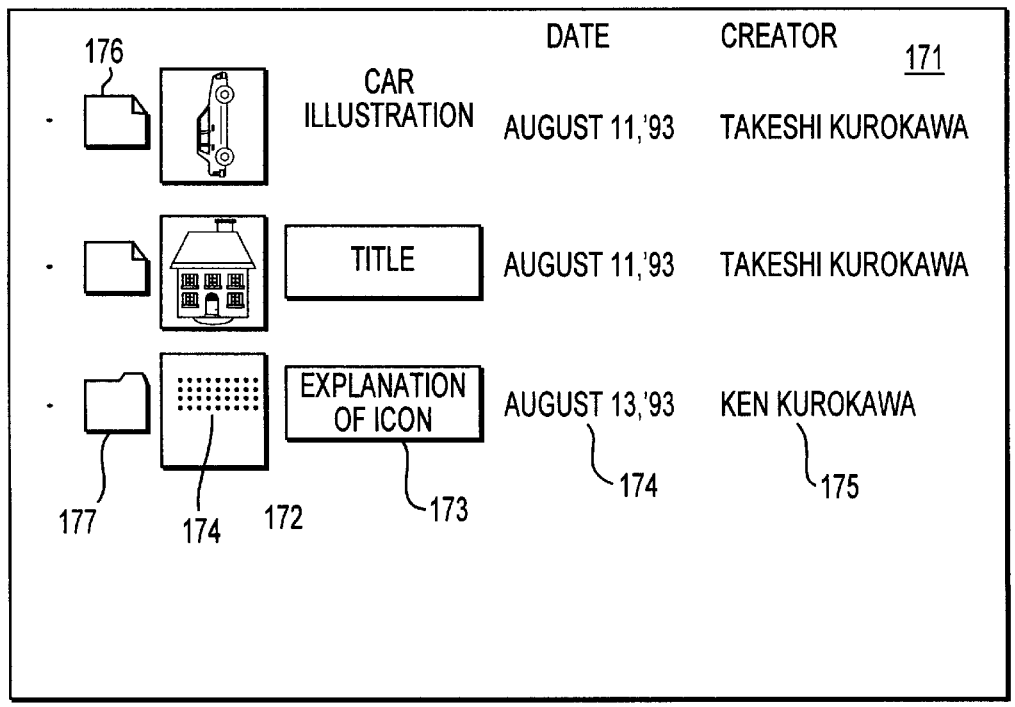
FIG. 14 is a diagram showing another type of the instructive document.

Another instructive document designated by reference numeral 171 is shown in FIG. 14. The instructive document 171 is arranged such that when an input device makes an access to a file system and automatically generates a new instructive document describing the results of the process, the file attributes, such as a reduced image 172, an image file name 173, document creating date 174, and a creator 175 are displayed. This instructive document has the following advantages.

a) It is possible to express the types of the files in different forms of icons.

The types of the files may be expressed by icons such that the text file is expressed by an icon of a document form (176), the directory, by an icon of a folder form (177), and a plural number of text files, by an icon of the form of a book (not shown). Accordingly, the user can recognize the types of the files in an easy and quick manner. With this, the file system of a hierarchy structure can be displayed legibly.

b) It is possible to display a reduced image 172 of a file.

With this advantageous feature, the user can easily understand the contents of the file. In this case, if the instructive document is designed so as to display the code data 178 in addition to the image data, the image of the file when it is output from a printer, for example, may be displayed.

c) It is possible to display the image file name 173 that is written by hand.

An image handwritten by the user when the file is stored is displayed as it is. Therefore, a user can readily find its file.

d) It is possible to display other attributes than the above attributes, that the user desires.

An example of the two-dimensional array of icons will be described with reference to FIGS. 15 through 19. If the icons are two-dimensionally arrayed, the user can arrange the icons of the same type in a desired area on the display screen by moving these icons. With a configuration of the whole icon array, the user can easily understand that which directory is displayed, when comparing the icon array configuration with his memory.

A case where the two-dimensional icon array is applied to a file system will be described as in the previous case. The user inputs an instructive document by the image input device (FAX 16 or the like) and requests a directory.

Figure 15:
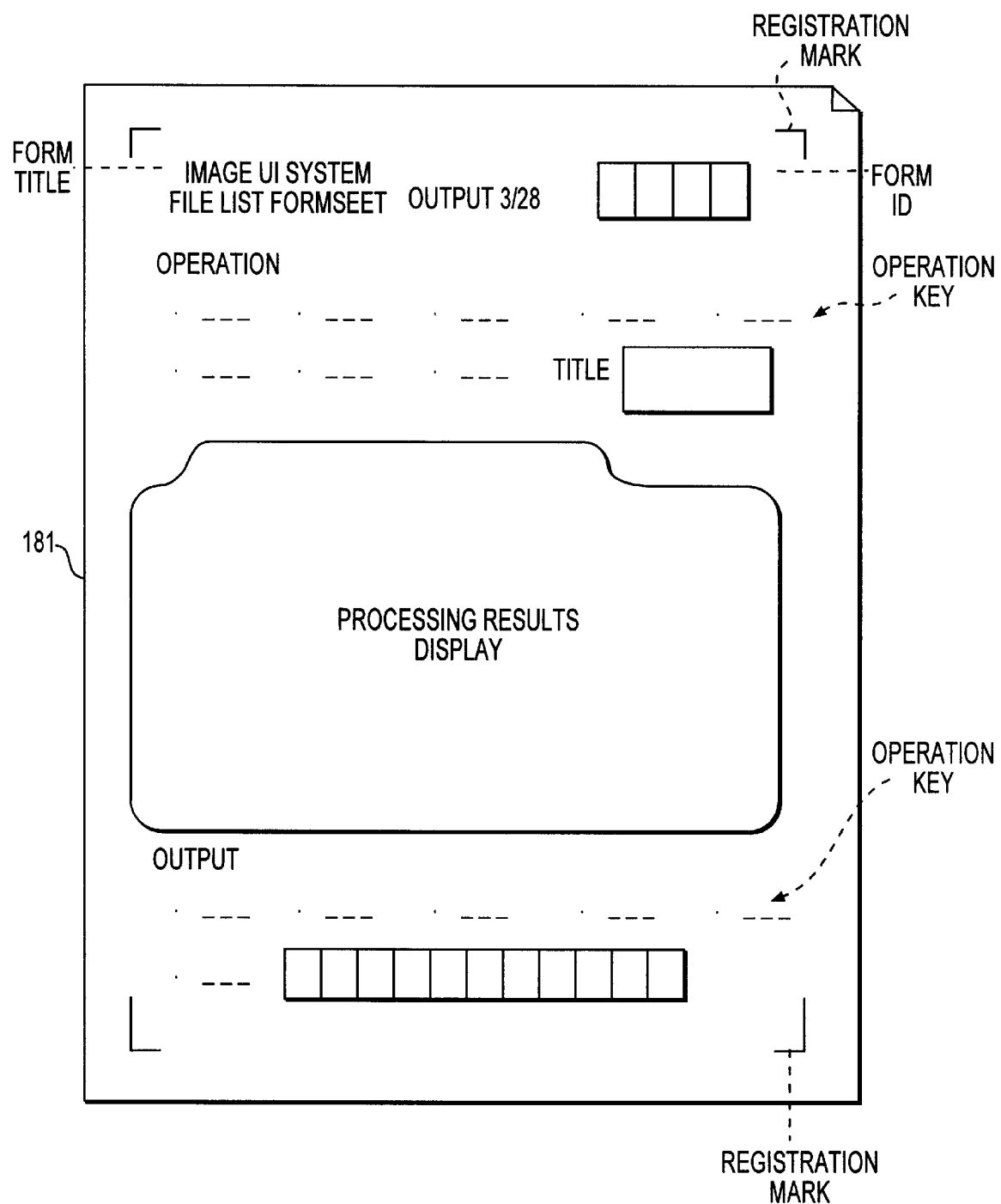
FIG. 15 is a diagram showing an example of the instructive document.

As a result, an instructive document 181 as shown in FIG. 15 is output, in this case.

The contents of the instructive document 181 will be described.

1) Registration marks

These marks are used for skew correction and for checking whether or not the input instructive document is that of the system.

2) Form title

A title of the instructive document is written in the area of a "form title". Character series displayed here may be designated by the user as he desires. If necessary, document output date may additionally be written in this area.

3) Form ID

A form ID for identifying/managing the instructive document is displayed in the area of "form ID". A decimal number of four figures is used for expressing the form ID. The form IDs and the instructive documents are provided in one-to-one correspondence. With the use of the form IDs, the instructive documents of various applications can be managed by one system.

4) Operation keys

The sectional area of the operation keys contains an area for inputting dots for user check and numerals, a handwrite area, operation keys for designating various processes, an output key for designating destinations, and the like. The form of display is the same as those shown in FIGS. 11, 12, and 20, for example. The illustration of it is omitted in FIG. 15.

The use causes the system to execute a desired operation or selects a file by selectively marking the dots (check dots) on the keys. Typical keys will be described hereinafter.

a) Contents display (OPEN)

This key is operated:

To open a drawer and a folder.

To open a file (retrieve).

To move the directory to the higher level directory (from the folder screen to the drawer screen or the desktop screen).

b) Return (HOME)

This key is used for returning to the desktop screen (to be given later).

c) Move (MOVE)

This key is used for moving to the folder or the file.

d) Store (STORE)

This key is used for storing the data of files. An index is used as the file name.

e) Copy (COPY)

This key is used for copying drawers, folders, and files. In this case, it is prohibited from giving the same index to different copies.

f) Rename (RENAME)

This is used for renaming the indices of drawers, folders, and files.

g) Drawer form (NewDrawer)

A new drawer is formed by this key.

h) Folder form (NewFolder)

A new folder is formed by this key.

i) Destination (OUTPUT)

This key is for designating a destination to which an instructive document or an input image is output. A plural number of destinations may be designated. The number of keys is equal to that of the destinations (for example, four keys for the printers, and one key for the FAX). A composite option (4 and 9 sheets) is optionally available.

5) Process result display

Those based on the results of the previous process, for example, the files of the results of the previous processes of the list, retrieval and the like, are two-dimensionally displayed in the form of icons.

A basic drawer screen, and a drawer screen and a folder screen, which are presented when a drawer and a folder are opened, are displayed in the area of the process result display (5). These screens will be described hereinafter.

Figure 16:
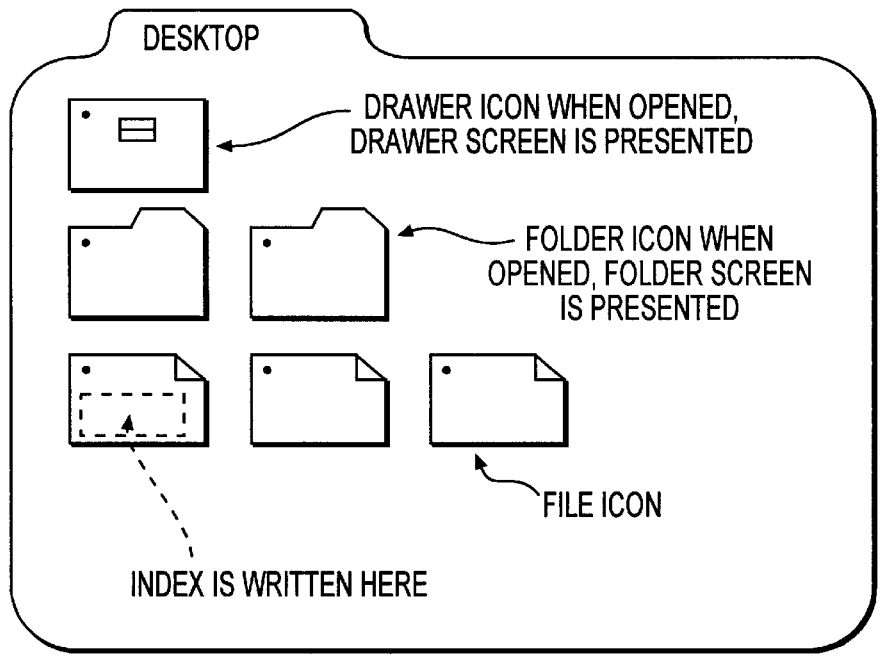
FIG. 16 is a diagram showing a desktop screen of the instructive document.

The word "screen" means both a picture printed out on the instructive document and a picture displayed on the screen of the display device. It is somewhat unnatural to use the word "screen" for expressing a picture printed out on a paper. However, the word is used for the following two reasons. No other suitable words come into my mind. Further, in the present invention, the contents of the instructive document are changed in accordance with the results of processing by the information processing system, as of the screen of the display device.

a) Desktop screen (FIG. 16)

Figure 17:
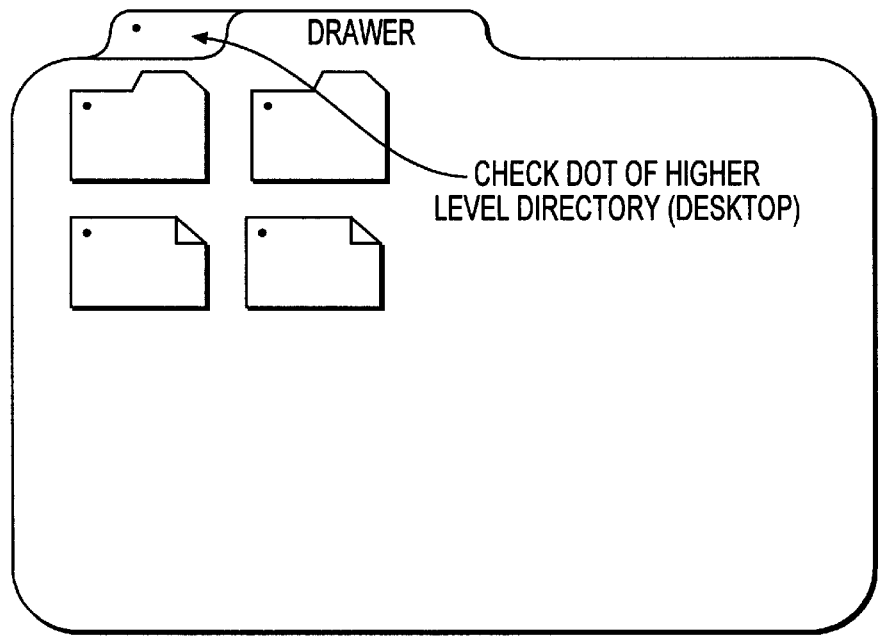
FIG. 17 is a diagram showing a drawer screen of the instructive document.

Drawer icons, folder icons, and file icons may be displayed on this screen.

b) Drawer screen (FIG. 17)

Figure 18:
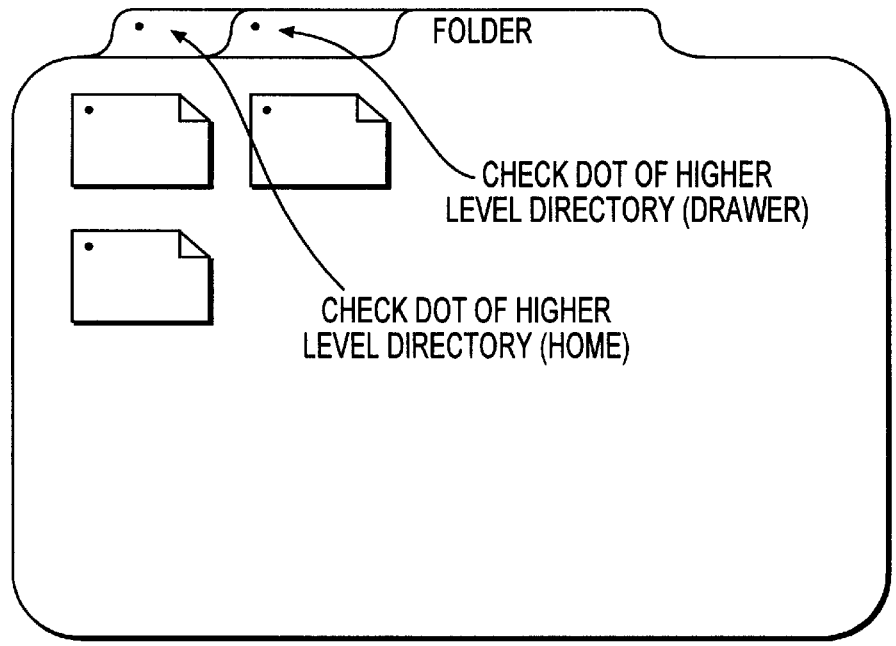
FIG. 18 is a diagram showing a folder screen of the instructive document.

Folder icons and file icons may be displayed on this screen.

c) Folder screen (FIG. 18)

File icons may be displayed on this screen.

Examples of operations on the desktop, drawer, and folder screens will be described hereinafter (The parenthesized portions in the operation steps are optional.). For the operation keys, reference is made to FIGS. 10 and 11.

1. Operation on the desktop screen (FIG. 16)

(1) Operation to form a new drawer
  a) Tick off the drawer generation key.
  b) Write a title image in the handwrite input area.
  c) Tick off the drawer-generation-destined key.
  d) [Tick off the destination.]

When the destination is ticked, the instructive document after processed is output to the destination.

(2) Operation to form a new folder.
  a) Tick off the folder generation key.
  b) Write a title image in the handwrite input area.
  c) Tick off the folder-generation-destined key.
  d) [Tick off the destination.]

When the destination is ticked, the instructive document after processed is output to the destination.

(3) Operation to form a file.
  a) Tick off the folder generation key.
  b) Write a title image in the handwrite input area.
  c) Tick off the file-generation-destined key.
  d) [Tick off the destination].
  e) Send the instructive document with data attached thereto.

When the destination is ticked, the instructive document after processed is output to the destination. When the destination specified is a folder or a drawer, the file is formed in the folder or the drawer. X and Y coordinates are automatically attached thereto.

(4) Operation to open a drawer or a folder
  a) Tick off the open key.
  b) Tick off the drawer or folder to be opened (A plural number of drawers or folders may be designated.).
  c) Tick off the destination key.

(5) Operation to retrieve a file (retrieve)
  a) Tick off the retrieval key
  b) Tick off the file, drawer or folder to be retrieved (A plural number of files, drawers or folders may be designated.).
  c) Tick off the destination key.

(6) Operation to delete the drawer, folder, and file
  a) Tick off the delete key
  b) Tick off the file, drawer or folder to be deleted (A plural number of files, drawers or folders may be designated.).
  c) [Tick off the destination key].

When the destination is ticked, the instructive document after processed is output to the destination.

(7) Operation to move the folder and file
  a) Tick off the move key
  b) Tick off the file, drawer or folder to be moved (two locations, a location from which any of those is moved, and a location to which any of those is moved)
  c) [Tick off the destination key].

2. Operations on the drawer screen (FIG. 17)

(1) Operation to form a new folder
(2) Operation to form a file
(3) Operation to open a file
(4) Operation to retrieve a file The operations of (1) to (4) above are the same as the corresponding ones in "1. Operations on the desktop screen".

(5) Operation to close a drawer (change to the desktop screen)
  a) Tick off the open key.
  b) Tick off the desktop screen key.
  c) Tick off the destination key.

(6) Operation to delete a folder and a file
(7) Operation to move a folder and a file The operations of (6) to (7) above are the same as the corresponding ones in "1. Operations on the desktop screen".

3. Operation on the folder screen (FIG. 18)

(1) Operation to form a file
(2) Operation to form a file

The operations of (1) to (2) above are the same as the corresponding ones in "1. Operations on the desktop screen".

(3) Operation to close a folder (change to a drawer screen or a desktop screen)
  a) Tick off the open key.
  b) Tick off the desktop screen or the drawer screen
  c) Tick off the destination key.
(4) Operation to delete a file
(5) Operation to move a file The operations of (4) to (5) above are the same as the corresponding ones in "1. Operations on the desktop screen".

As described above, various operations can be carried out by using the instructive document of the same style.

The icons will be described. As described above, any of the file name, the image file name, and the reduced image may be displayed in the icon. The file name is described in the code (ASCII or EUC). The image file name is a reduction of an image (characters or graphics) that is handwritten by the user when its file is stored.

The reduced image is a reduction of an image when its file is output. These are displayed irrespective of the description style of the file, the code style (ASCII, EUC, PostScript or the like) or the image style (SunRaster, ppm, jpeg or the like). When the file is a folder, the first sheet or the first file is displayed in a reduced form.

Figure 19:
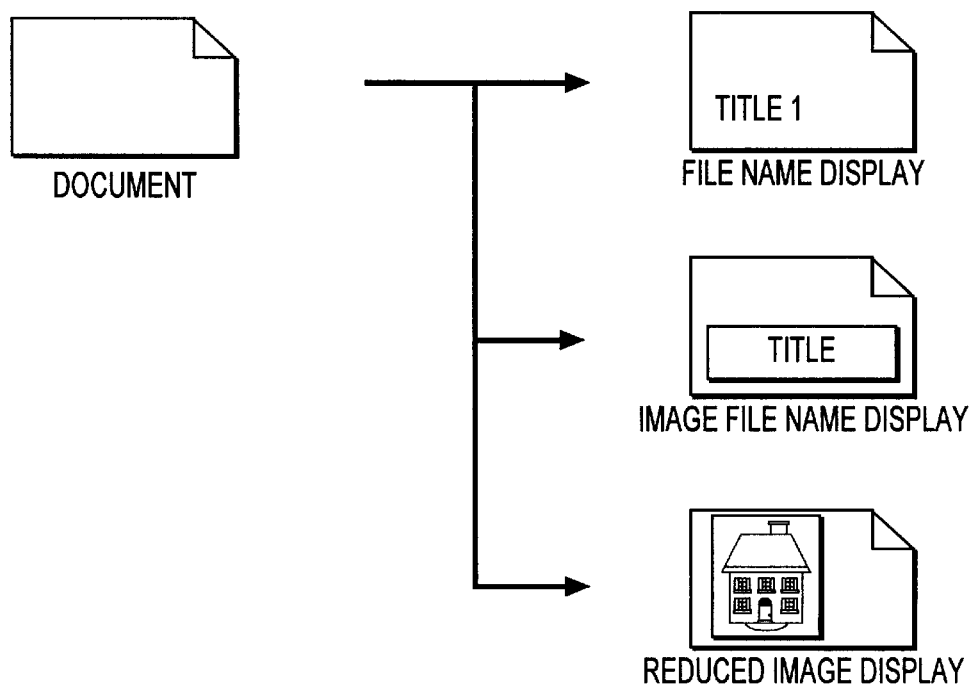
FIG. 19 is a diagram showing the form of an icon, and an example of the file name displayed therein.

The form of the icon and examples of the file names are illustrated in FIG. 19.

Figure 20:
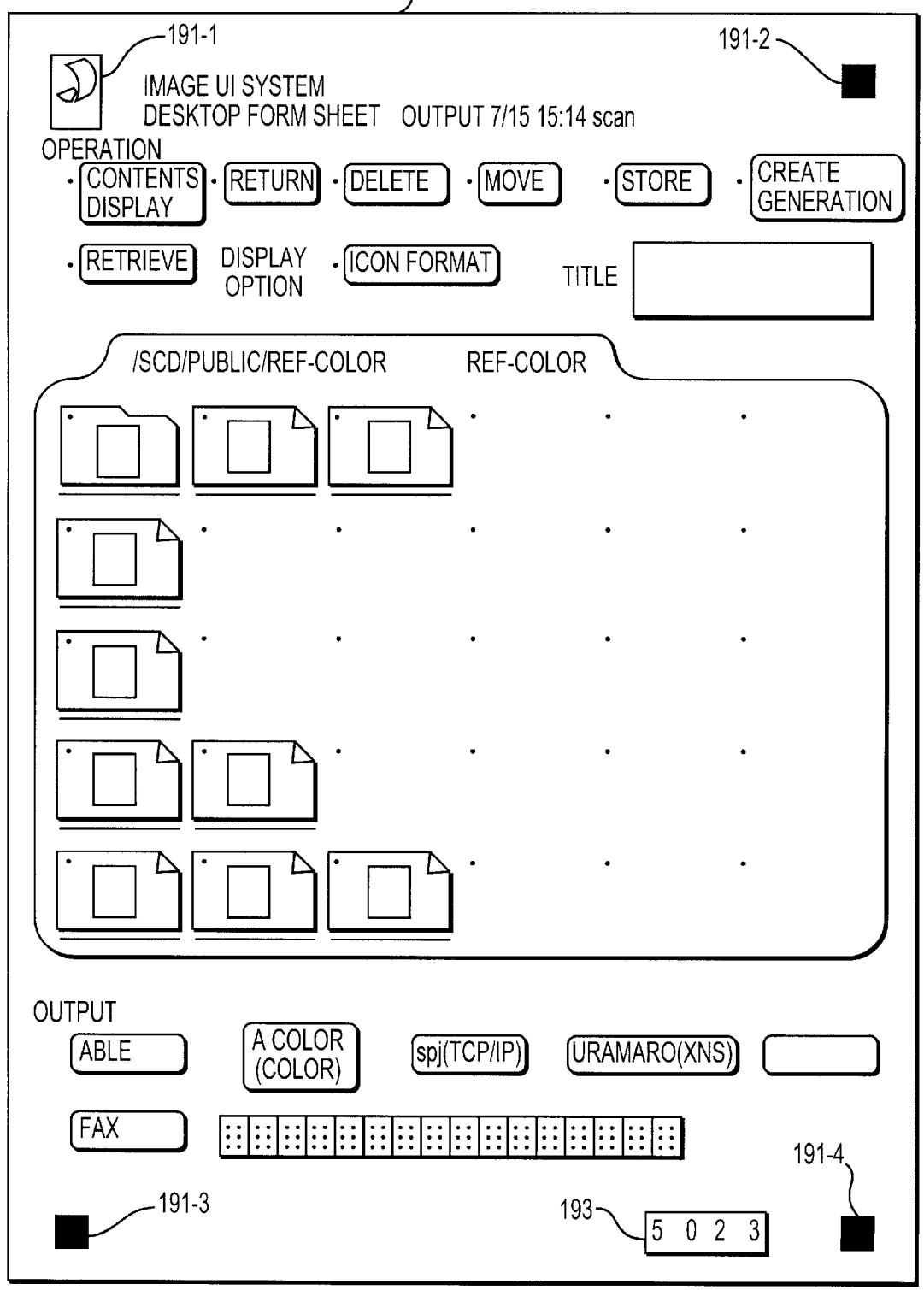
FIG. 20 is a diagram showing a further example of the instructive document.

Another type of registration marks is shown in FIG. 20. In the figure, the registration marks are designated by reference numeral 191. This type of the registration marks 191 has the following advantages.

(1) The registration marks are used for discriminating an instructive document. The store marks 43 shown in FIG. 2 are rather general in form. Accordingly, when those marks are used, a document, not an instructive document, may mistakenly be recognized as an instructive document.

Since the registration marks 191 consists of one logo mark (191-1) and three black painted squares (191-2 to 191-4), such a mistaken recognition is eliminated.

(2) To recognize the store marks 43-1 to 43-4 shown in FIG. 2, four images must be extracted and recognized. Accordingly, much time is taken for the image processing. On the other hand, the registration marks 191 can be image processed quickly since the extraction/recognition of such four images is not required.

(3) The store marks 43-1 to 43-4 shown in FIG. 2 are used for the skew correction and the enlargement/reduction correction, which follow the recognition of the instructive document. These marks are oriented in different directions at the four corners on the instructive document. Therefore, different recognition algorithms must be used to recognize these marks. This results in complexity of the recognition process. The registration marks 191 shown in FIG. 20 is free from such a complexity of the process.

The registration marks 191 contains the logo mark 191-1 exclusively used for discriminating the instructive document, so that the instructive document can be discriminated quickly.

(4) Further, the same square registration marks 191-2 to 191-4 are used, so that the process is easy and less time is taken for the image correction.

The analysis of the instructive document 192 with the registration marks 191 is carried out in the following way. To start with, the input device cuts off the image in the left upper portion or the right lower portion from the instructive document. And the input device checks whether or not the logo mark 191-1 is present.

If the logo mark is present, the document is an instructive document. If it is not the instructive document, the input device sends information indicating that the document is not the instructive document to the system (application), and ends the process. If it is the instructive document, the input device detects four squares of the logo mark 191-1 and the registration marks 191-2 to 191-4, recognizes that the logo mark is located at the left upper corner, and generates the coordinates data for position correction. The input device works out a quantity of correction on the basis of the coordinates data and corrects the image data. Here, the word "correction" means the rotation, translation, enlargement/reduction of an image, and the like.

The input device recognizes the numerical area to be a form ID and the numerals on the basis of the corrected image, and generates a form ID.

The form of the form ID 41 in the instructive document shown in FIG. 2 is different from that of the form ID 193 in the instructive document shown in FIG. 20. The form ID 193 is superior to the form ID 41 since the former can effectively utilize the limited area on the instructive document. When the form ID 193 is used, the instructive document may contain greater number of commands, instructions, and information. In other words, the quantity of information for users is increased.

Figure 21:
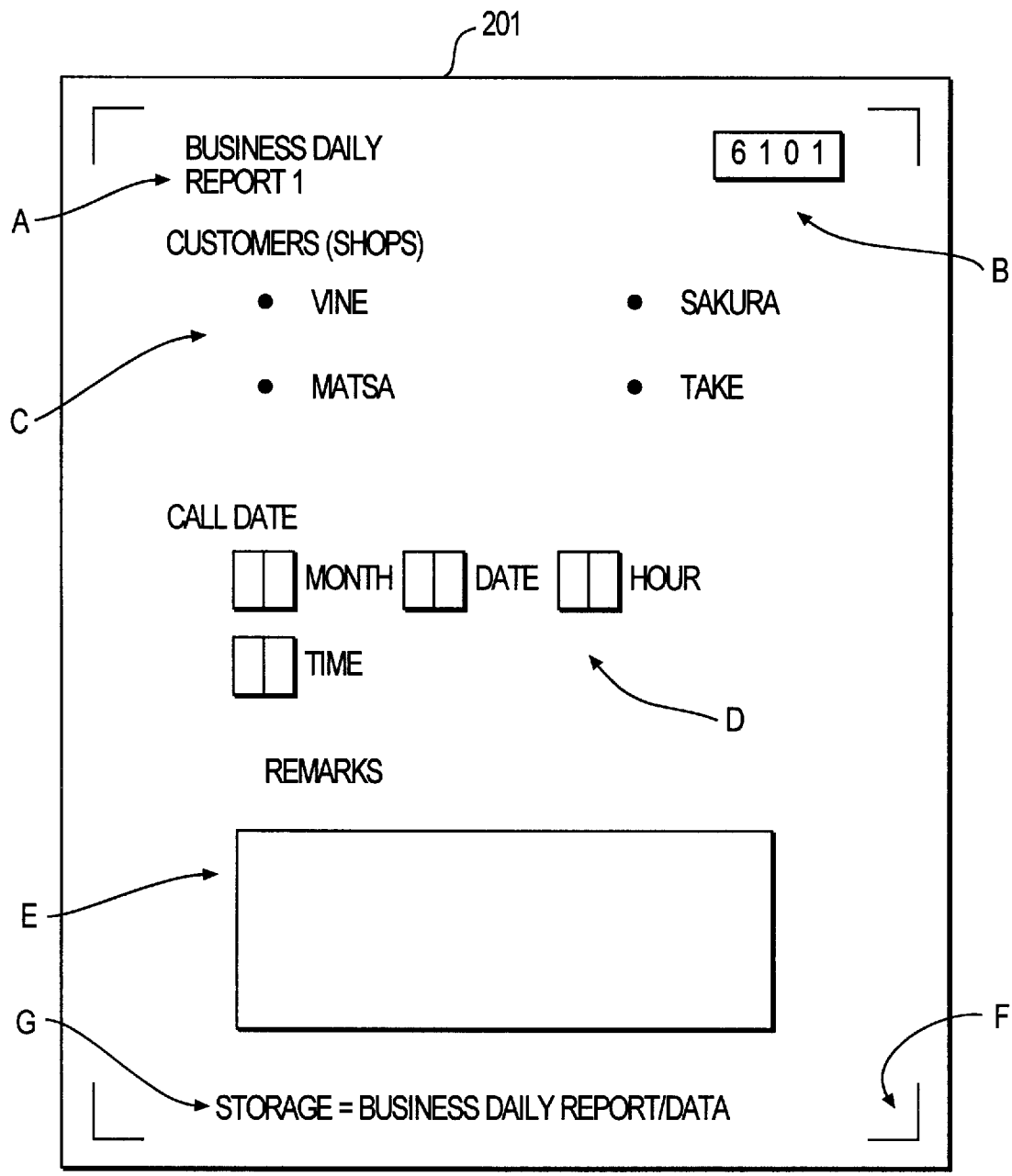
FIG. 21 is a diagram showing an example of a before-written instructive document.

The application of the instructive document to the business management will be described with reference to FIGS. 21 to 24. FIG. 21 shows an instructive document 201 before entries are made therein. In the figure, A indicates the title of the instructive document; B, a form ID; and C, check dots attached to four shops. D indicates four numeral frames. E indicates a rectangular area as a handwrite area. F indicates registration marks, and G, the directory name of a storage place in which data written into the instructive document is stored.

FIG. 22 shows the instructive document 201 after entries are made therein. FIG. 23 shows a table showing examples of the items for image analysis, called instructive document item information. The instructive document item information is contained in the instructive document 201.

The instructive document item information are identified by item IDs. The information of item kind, position, and size are used for the image analysis. The meaning of the title are utilized for storing the ticked check dots, in order to retrieve attributes. The group ID is used for discriminating a group of items, as mentioned above. The number of digits is used for designating the number of the numeral boxes in the numeral frame area. The position and the size are expressed by the number of rows and the number of columns.

Items 1 to 4 in the column of the item ID correspond to "C" in FIG. 21. Items 5 to 8 in the item ID column correspond to "D" in FIG. 21. Item 9 in the item ID column corresponds to "E" in FIG. 21.

FIG. 24 shows an example of the language for describing the information of instructive document items shown in FIG. 23. The language is similar to that of the analysis information shown in FIG. 4. In the language, a form ID is designated in the declaration of FormSheet. In this instance, form ID=6001.

The name of the instructive document is written in the location of FormName. The directory name is written in the location of FormGroup. An instructive-document paper written by the user is stored into the location of the directory when it is stored into an image file.

The item ID is written in the location of ItemID. The group ID is written in the location GroupID. The item kind is written in the location of ItemKind. The position is written in the location of Position. The character series of the title is written in the location of Title.

The application of the instructive document to a questionnaire totalizing system will be described with reference to FIGS. 25 to 31. An application software for realizing this system is made up of an INIT section for an initializing process and an EXEC section for executing commands.

Figure 25:
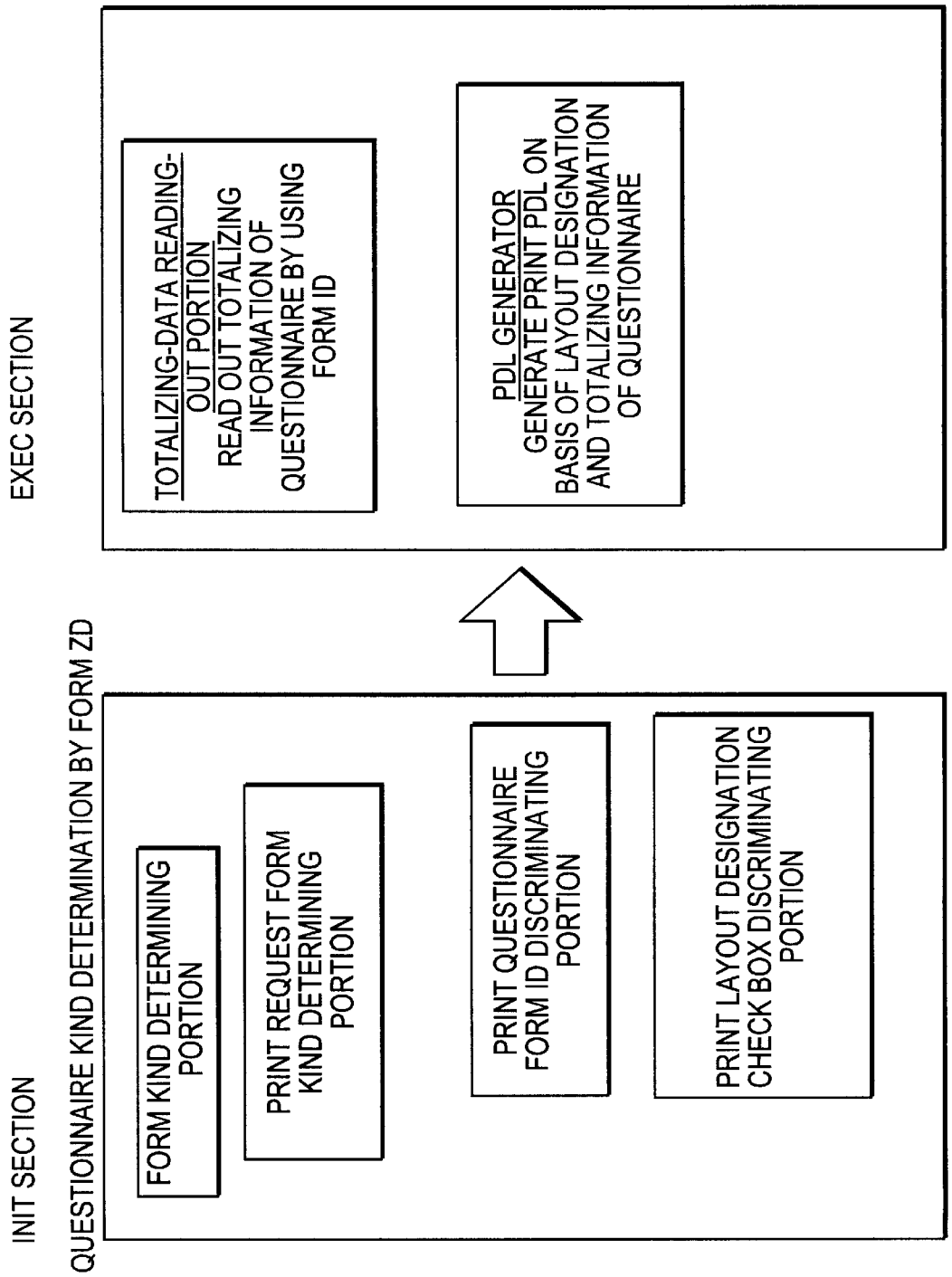
FIG. 25 is a block diagram showing the construction of a questionnaire application.

The INIT section interprets the instructive document and prepares for the execution of a process, and the EXEC section executes the processing of image data received from the input/output control unit 22 (FIG. 25).

The INIT section, driven by the input/output control unit 22, interprets the meanings of the checks made by the user in accordance with the received data of the instructive document, the form ID, and the check boxes.

At this time, the INIT section recognizes the meanings of the check boxes in the instructive document, and sends a request of scanning, and a request of altering the settings of the scanning resolution, tone, and the like to the input/output control unit 22 in accordance with the user's requests described in the instructive document.

When the instructive document contains the numeral input area and the image input area, the INIT section executes the process through a numeral recognition means and an image cut-off processing means.

The EXEC section is also driven by the input/output control unit 22. The process executed by the EXEC section is determined by the INIT section, and executed using the common library and the input/output interface.

The details of the INIT section will be described. When receiving the data of the instructive document, the INIT section takes out the information on the questionnaire instructive document from the form ID, and analyzes the image analysis items in the instructive document. These processes are executed by the following processing portions.
a) Form kind determining portion
  This portion determines the form ID, takes the form ID out of the image, and takes out the list of the item information in the instructive document.
b) Item ID determining portion
  This portion takes out the IDs of the items for image analysis in the instructive document, and acquires the memory locations of the memory in which the IDs are to be stored.
c) Item kind determining portion
  This portion branches the process every item kind while referring to the list of the item information.
d) Handwrite-area storing portion
  When the item for image analysis is the handwrite area, this portion is called by the item kind determining portion, acquires the memory location for the handwrite area, and takes out the image of only that area. This image may be taken out in any of two ways. In the first way, it is taken out in the form of a two-dimensional image of the whole image of the instructive document. In the second way, an image of that area is generated anew.
e) OCR-process call portion
  When the item for image analysis is the handwrite area, this portion is called by the item kind determining portion, and calls the OCR function while referring to the list. In order to store the image read by the OCR function into the file, the data is stored in the memory.
f) OCR function
  This function converts the image containing alphabet characters written by hand into a series of code characters.
g) Check dot character When the item for image analysis is check dots, this character is called by the item kind determining portion, and determines whether or not the check by the user is present. To store the determination results into the file, the data is stored in the memory.
[Data totalizing portion]
  The results of the totalization is stored as a file. The totalizing method will be described. Numerical data are retained in an array of elements. Numerical values written into the questionnaire are written into the related elements of the array.

When a check dot is ticked off by the user, a count of the record corresponding to the ID of the ticked check dot is incremented by one.

When the image of the handwrite area is cut off, a unique file name is given to the cut-off image using the questionnaire serial number and the item ID, and the image is stored as an image file.
[EXEC section]
  The EXEC section stores the image data that is stored in the memory by the INIT section, into the memory device. This storing process is carried out by the following processing portions.
a) Totalizing-data reading-out portion
  When the totalized data is already present, this portion takes out that data, and prepares the data so as to be acceptable by totalizing and sum-totalizing portions.
b) Totalizing portion
  When the check dots in the instructive document are ticked off, this portion increments by one the integer value of the totalized data corresponding to the ticked check dots.
c) Sum totalizing portion
  This portion stores the numerals in the handwrite area. Arrays of numerals are filed, and increments by one the position of the numerical value written in by the user.
d) Individual accumulating portion
  This portion stores all of the individual answer results on the data of the type which cannot be converted into general data, such as data in the handwrite area.

Figure 26:
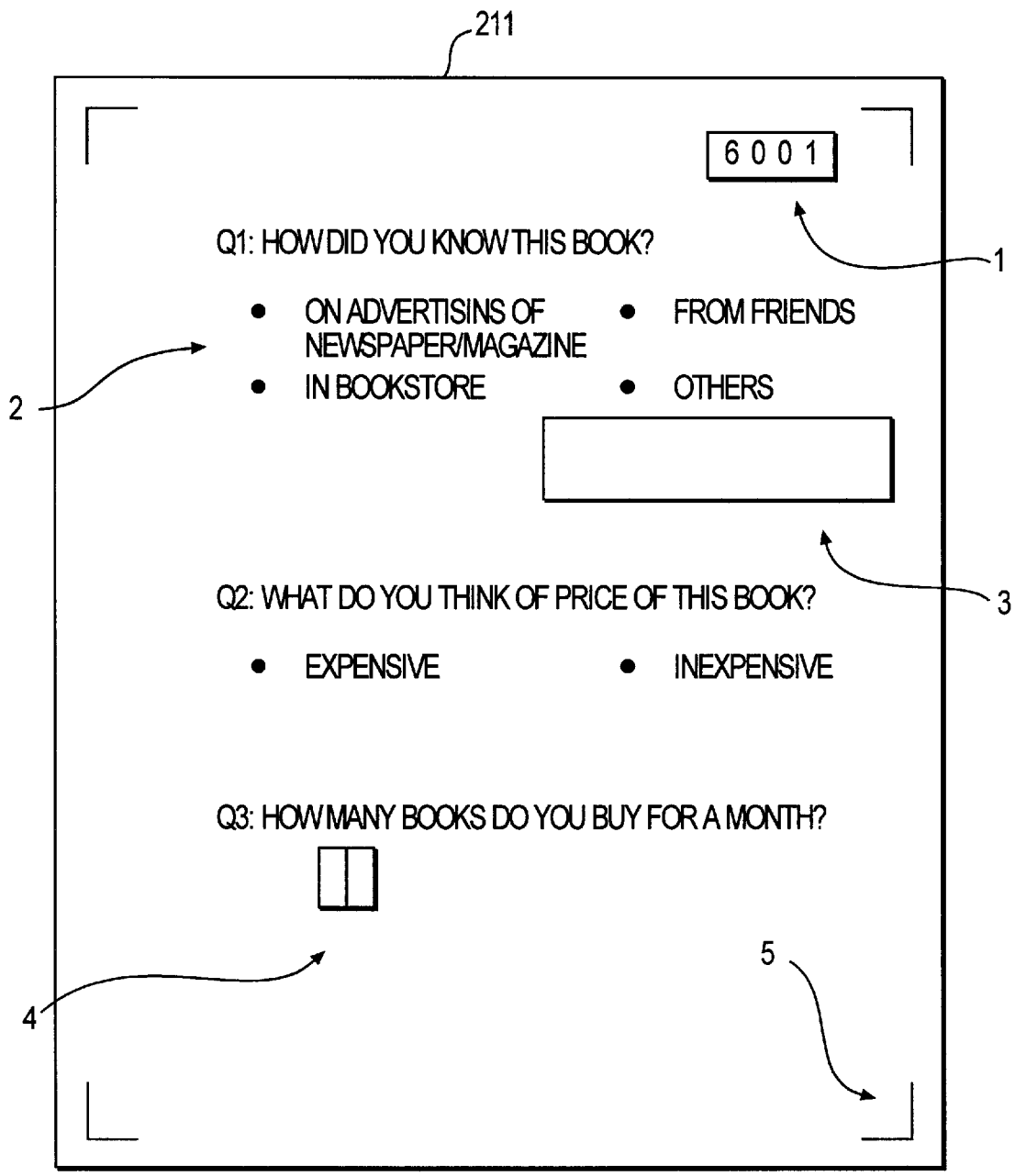
FIG. 26 is a diagram showing an example of an instructive document for questionnaire.

An example of a questionnaire instructive document 211 is shown in FIG. 26. Three questions are printed on a sheet of A4 size. In the sheet, (1) indicates a form ID; (2), check boxes; (3), a handwrite area; (4), a numeral write-in area; and (5), registration marks used for determining the orientation of the sheet, or the instructive document, and the enlargement/reduction of the image.

Figure 27:
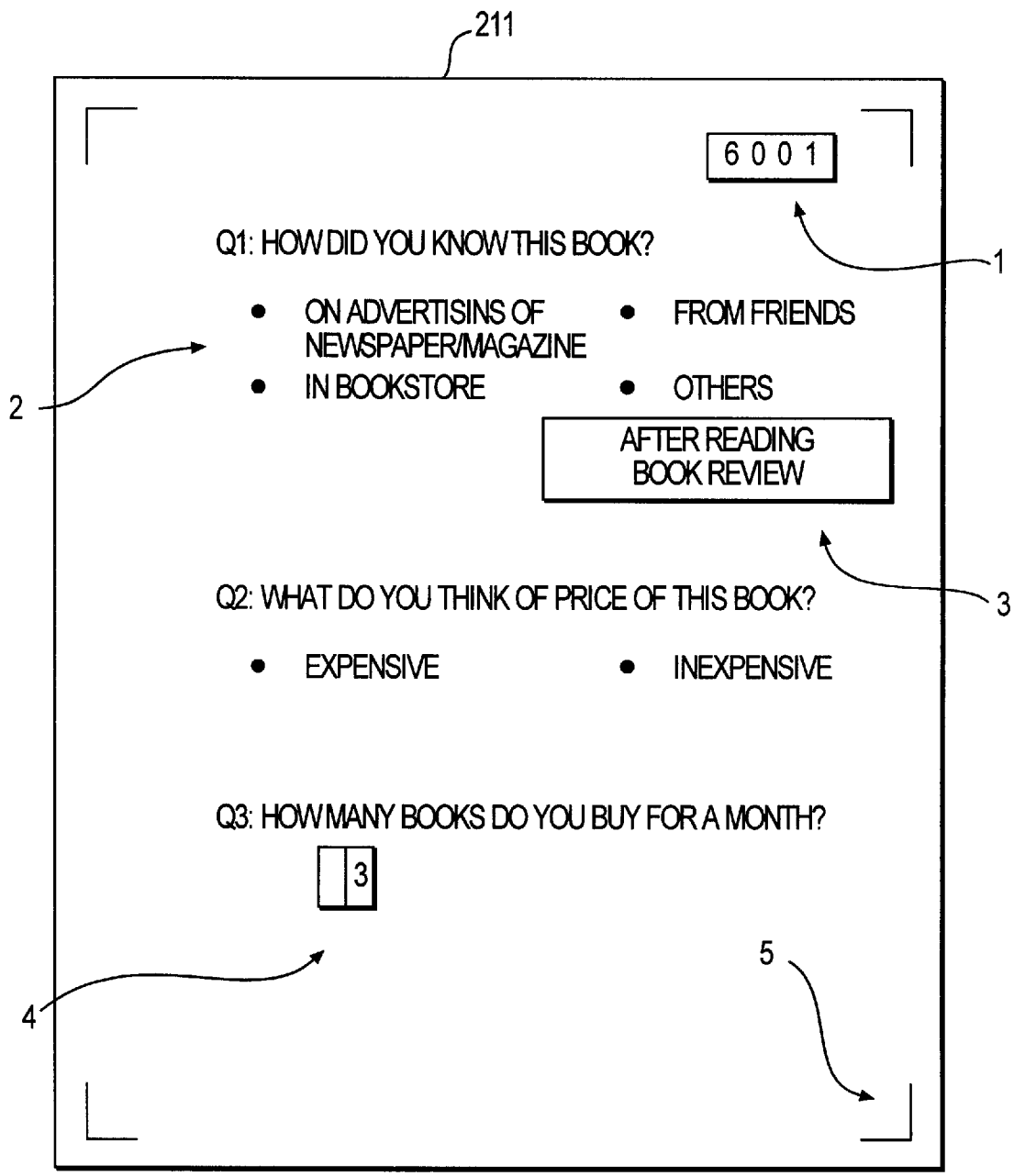
FIG. 27 is a diagram showing an example of the instructive document to which entries are made.
Figure 28:
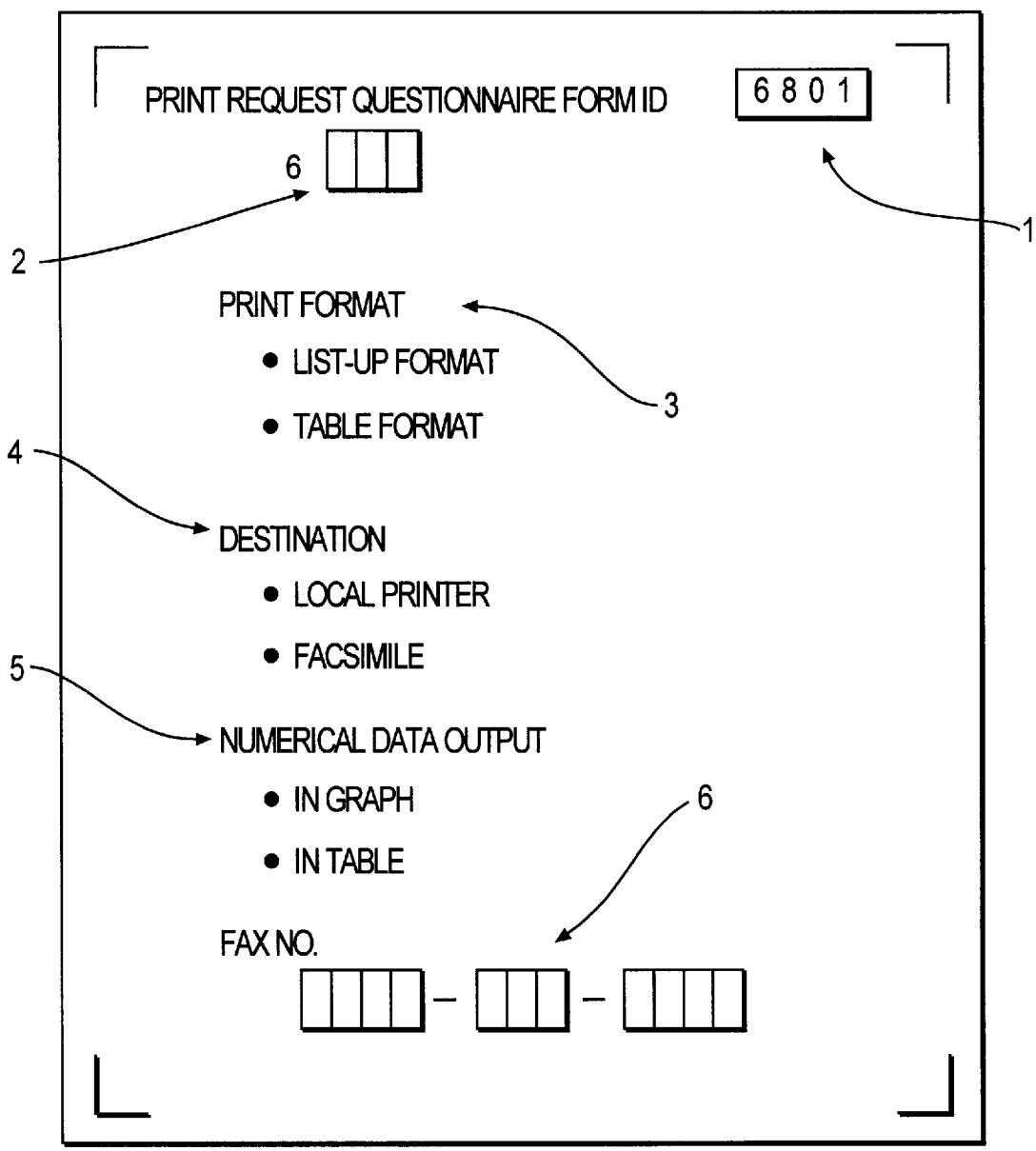
FIG. 28 is a diagram showing an example of the print request instructive document.

The sheet shown in FIG. 27 is the instructive document 211 after entries are made therein. As shown, the user ticks off the check dots of a question 1 "others", and a question 2 "Inexpensive". Further, he writes his answer in the handwrite area. Numeral "3" is written in a numeral box for a question 3. FIG. 28 shows an instructive document for causing printing means to print out the totalizing results of the questionnaire. In the instructive document, (1) indicates a form ID; (2), a numerical area for the form ID of the questionnaire requesting the print-out; (3), check dots for designating a print layout; and (4), check dots for selecting the destination, or the printing means, to which the data is output, the FAX or the local printer. (5) indicates check dots for selecting the form of the output data, graph or table. (6) indicates numerical boxes. When the printing means selected by "Destination" (4) above is the FAX, a facsimile number of the FAX to which the data is output is written in this boxes.

FIG. 29 shows an example of a report sheet output by the destination when receives the print request instructive document shown in FIG. 28. In the report sheet, reference numeral (1) designates a form ID; (2) and (3), the results of the totalization of the check dots of the answers to the questions 1 and 2; (4), the results of the totalization of the numerical values of the answers to the question 3.

Figure 30:
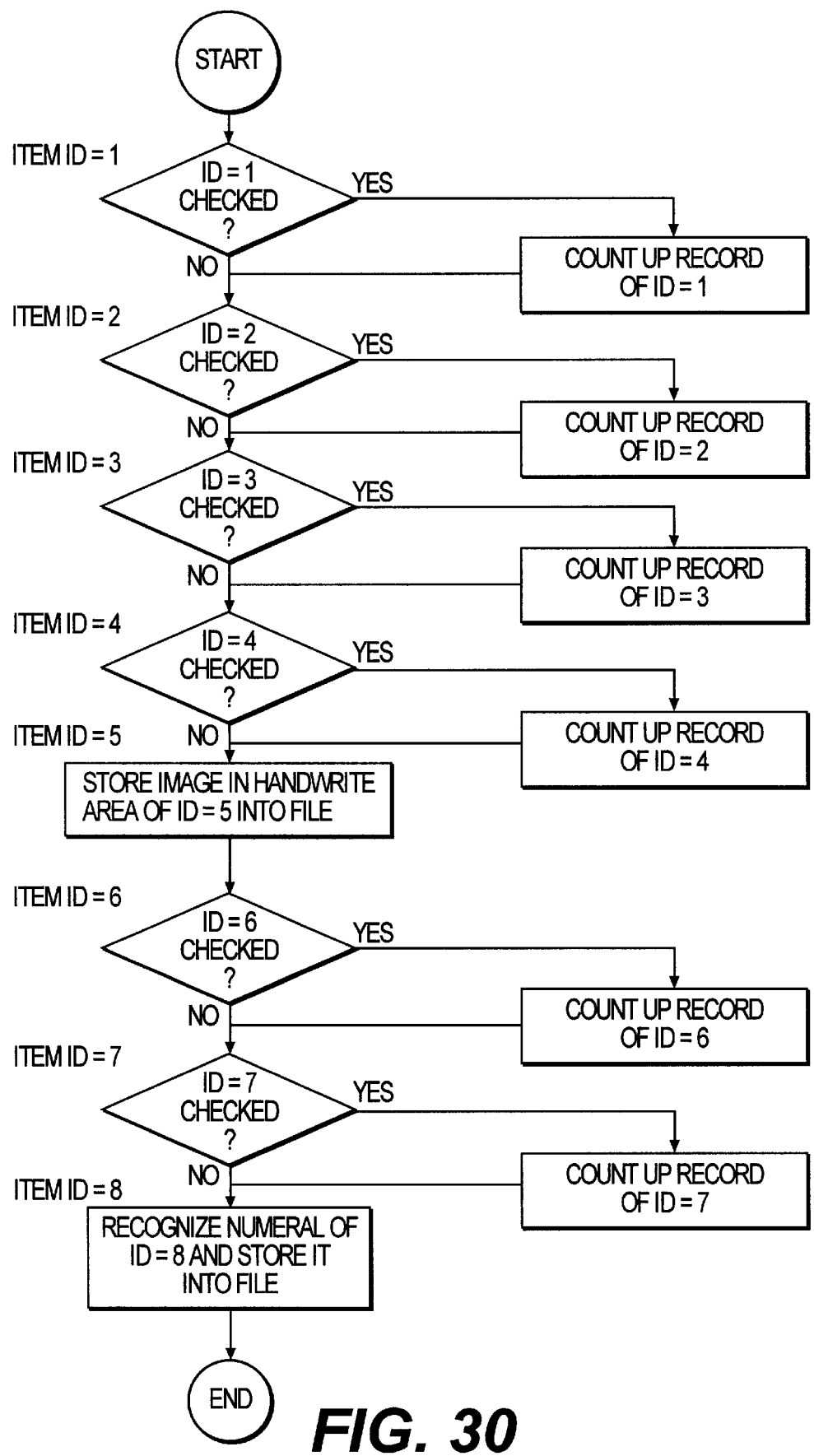
FIG. 30 is a flowchart showing a flow of questionnaire process.

FIG. 30 shows a flowchart of a questionnaire process program. FIG. 31y is a diagram showing a record structure of a file for totalizing the answers to the questions in the questionnaire sheet.

<Flow of the process in the questionnaire system>

It is assumed that the user takes the before-written instructive document as shown in FIG. 26, and ticks off the check dots and fills in blanks, viz., the numeral box (4) and the handwrite area (3), as shown in FIG. 27. The user sends the after-written instructive document thus formed to the input/output control unit 22, through the FAX 16. The information on the instructive document are analyzed and processed, and the results are stored into the hard disc 11 every item.

Subsequently, the user sends the print request instructive document shown in FIG. 28 to the input/output control unit. In this instance, entries made to the print request instructive document are: "Print request form ID"="6001", "Print format"="List-up format", and "Destination"="Facsimile", and "FAX No."=facsimile number of the user.

The user sends this sheet to the input/output control unit as in the sending of the questionnaire.

The input/output control unit analyzes the information on the print request instructive document, and determines that the input instructive document is the print request instructive document. In response to this, the output document shown in FIG. 29 is sent to the FAX of that number.

For ease of understanding the present invention, there are shown block diagrams for explaining the present invention in FIGS. 32 to 37. In these figures, expressions not used in the description thus far made are used. Of those expressions, major expressions will be described.

"Image U/I" corresponds to the input device of the present invention. "Pencil I/F" corresponds to the instructive document. "PS (postscript) file" corresponds to the instructive document form information.

Figure 32:
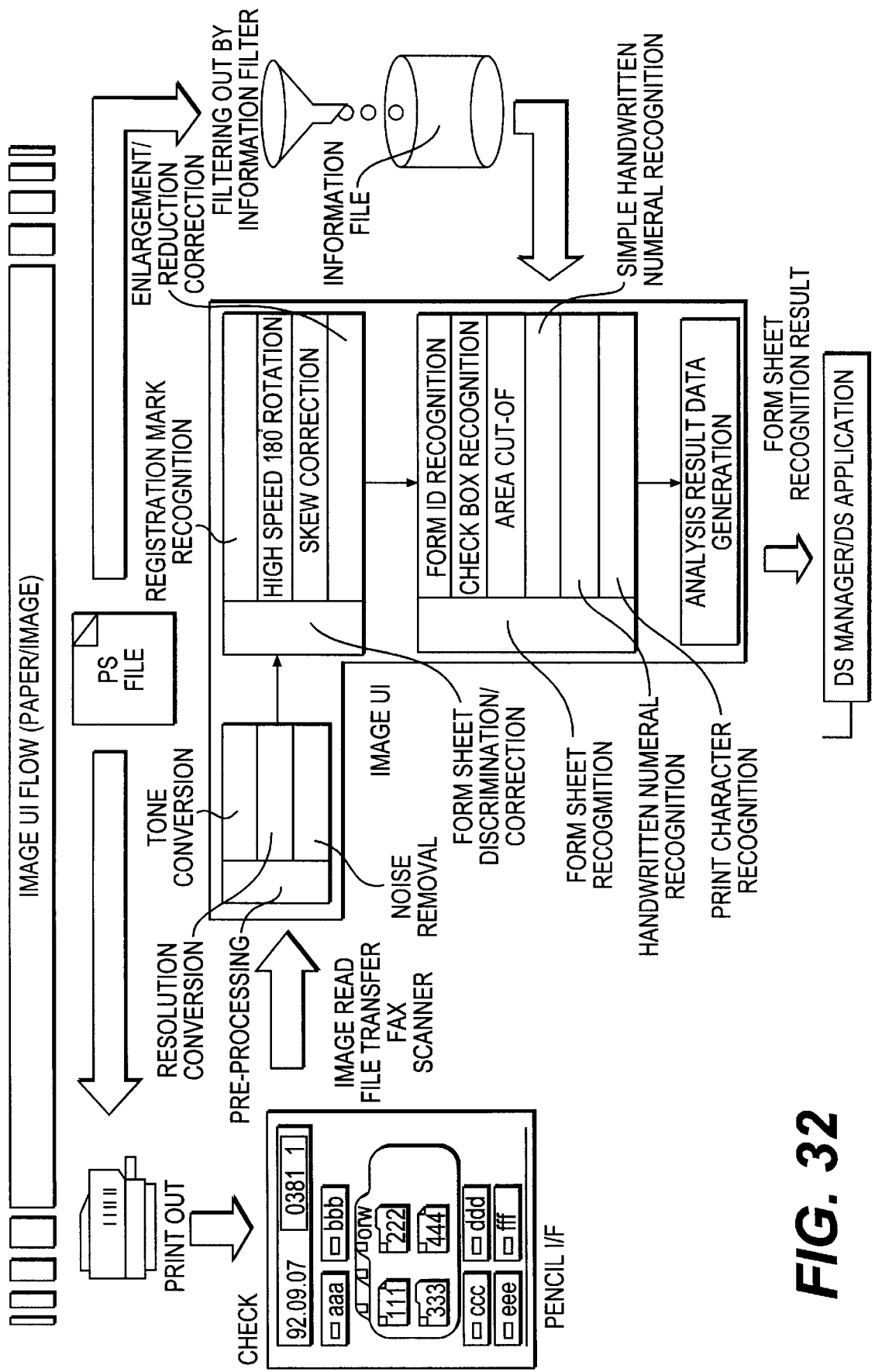
FIG. 32 shows a block diagram showing the outputting of a before-written instructive document and a state of the analysis of an after-written instructive document.

FIG. 32 shows a block diagram showing the outputting of a before-written instructive document and a state of the analysis of an after-written instructive document. This process is the same as that already described.

Figure 33:
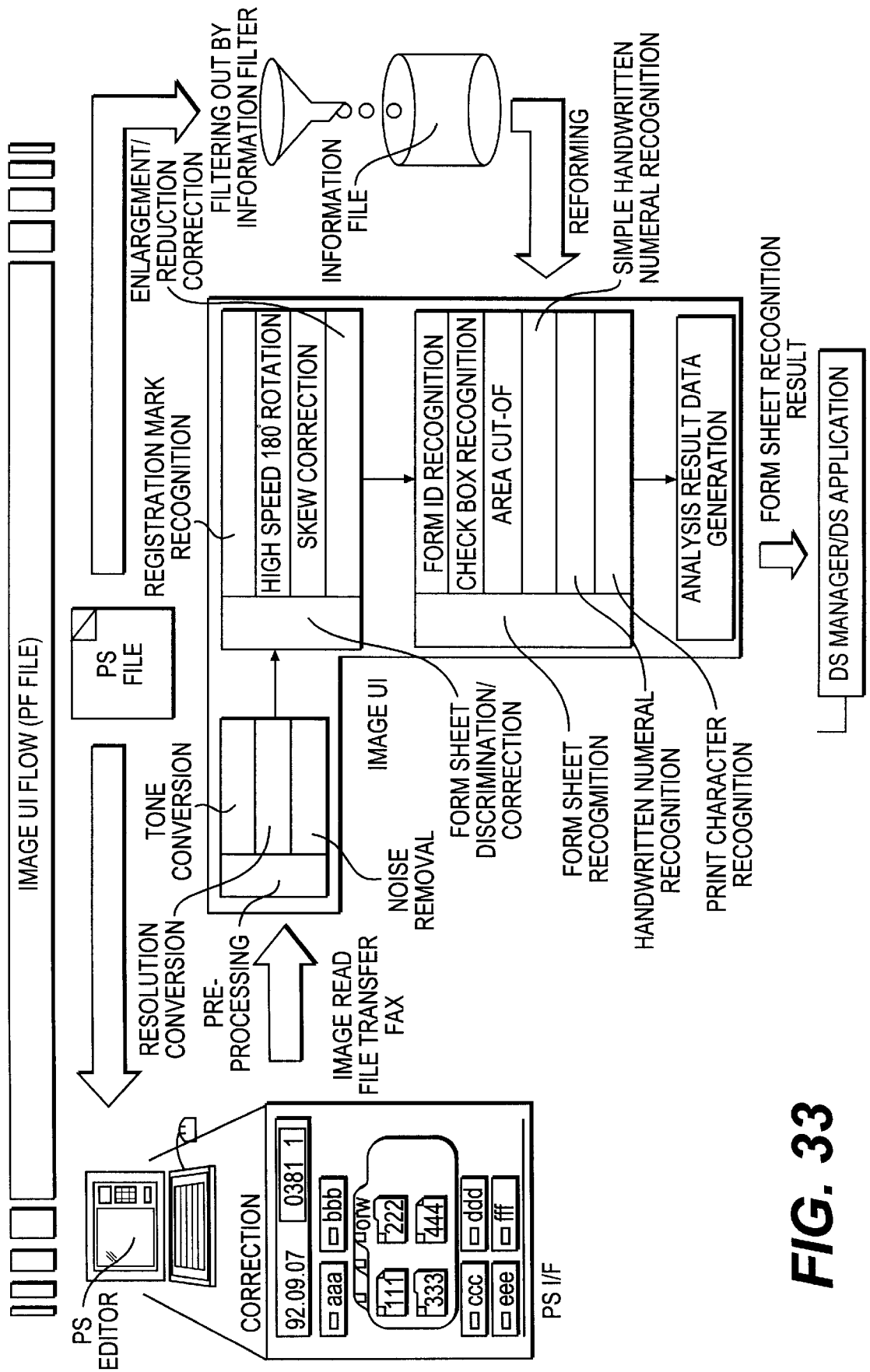
FIG. 33 shows a block diagram showing how a process as shown in FIG. 32 is carried out on the display screen.

FIG. 33 shows a block diagram showing how a process as shown in FIG. 32 is carried out on the display (by a PS editor). This process is the same as that which has been already described. "Information file" in FIGS. 32 and 33 corresponds to the analysis information. The "PS editor" means the editor of the postscript file.

Figure 34:
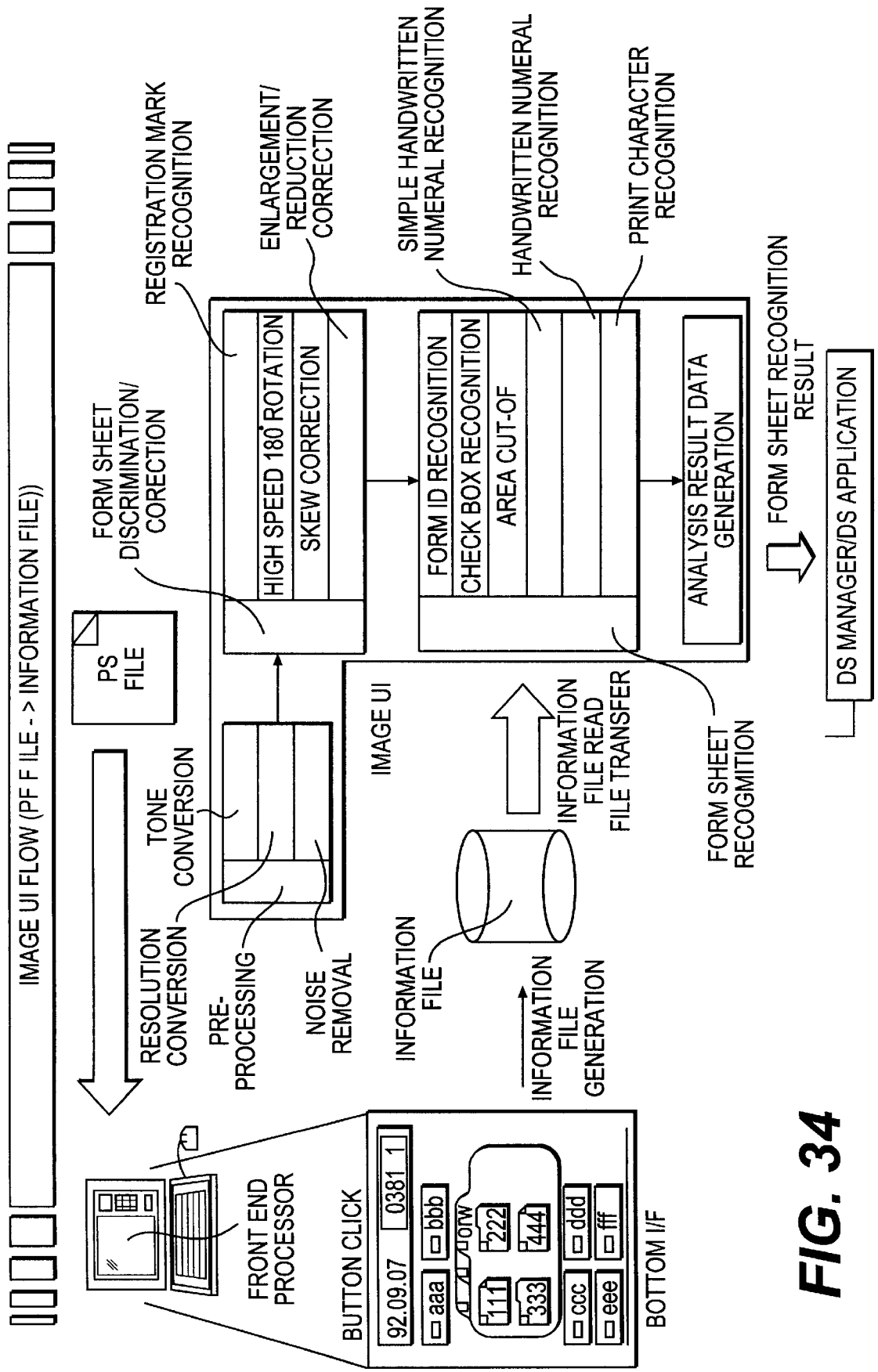
FIG. 34 shows a block diagram showing how to directly take out the definitions assigned to the check boxes on an instructive document on the display through button operations by the user.

FIG. 34 shows a block diagram showing how to directly take out the definitions assigned to the check boxes on an instructive document, viz., user entries to be input to the information processing system, on the display through button operations by the user. This process is the same as that which has been already described.

Figure 35:
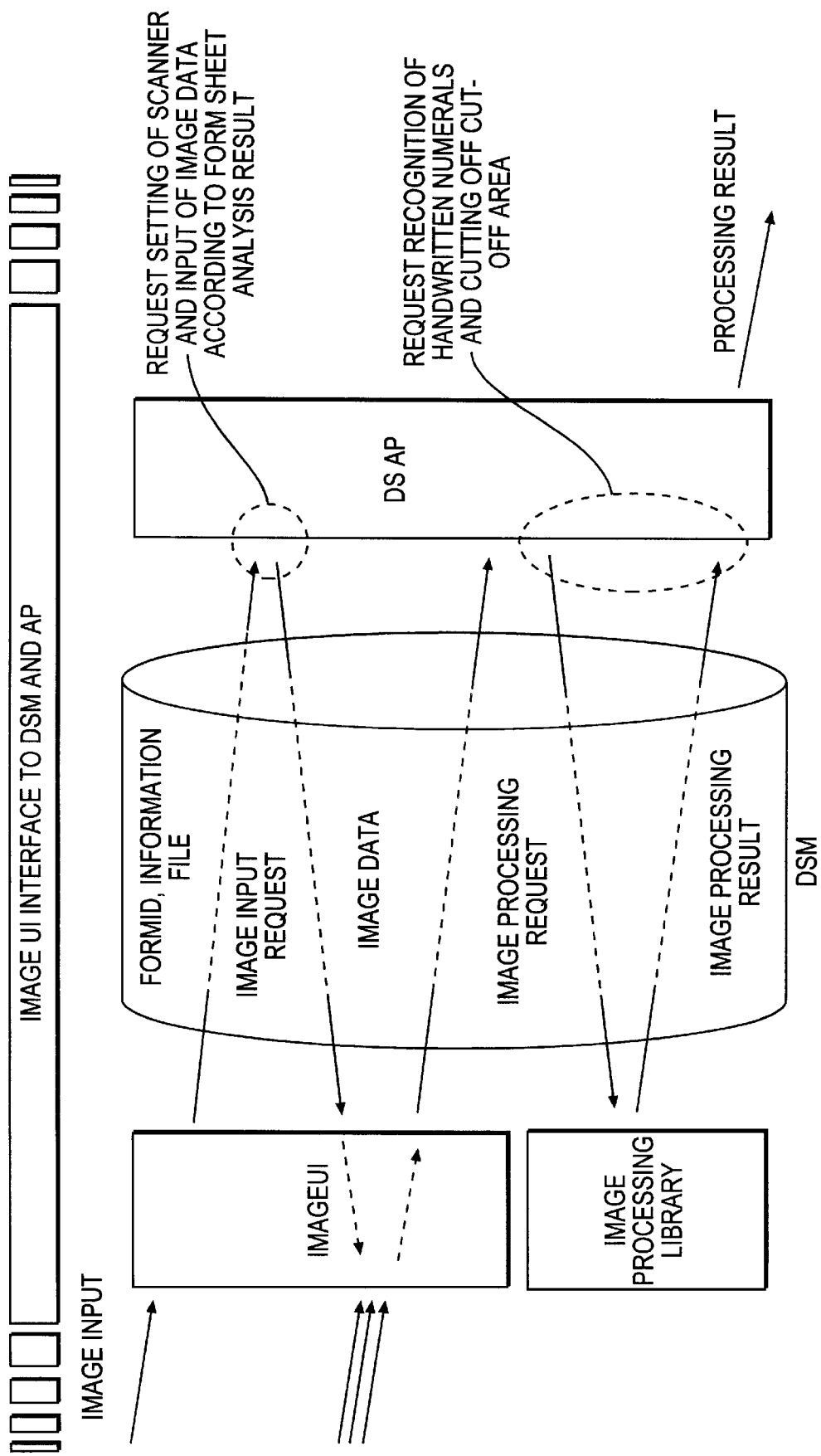
FIG. 35 is a block diagram showing process flows among the blocks.
Figure 36:
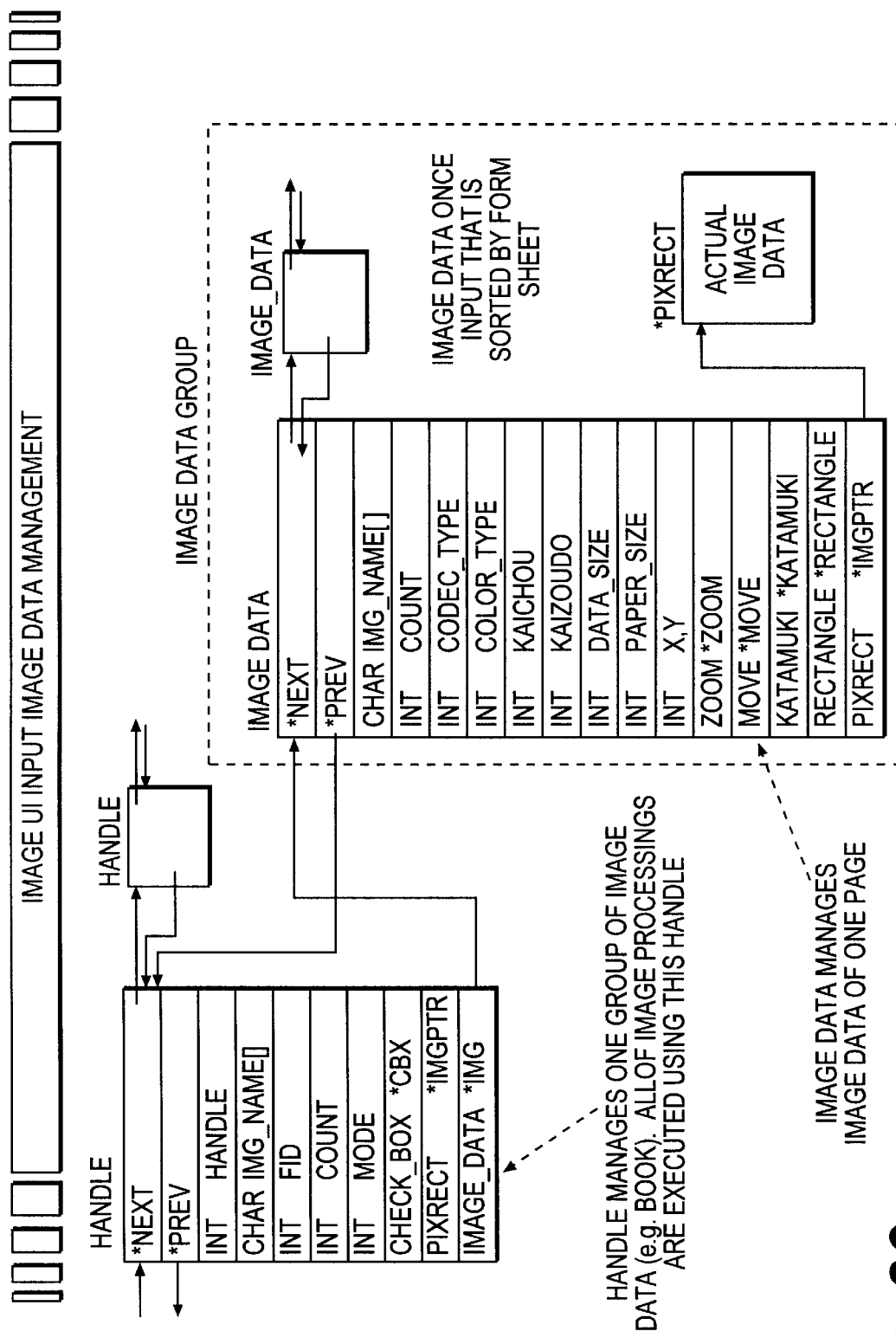
FIG. 36 is a block diagram showing the management of image data in an image file system.
Figure 37:
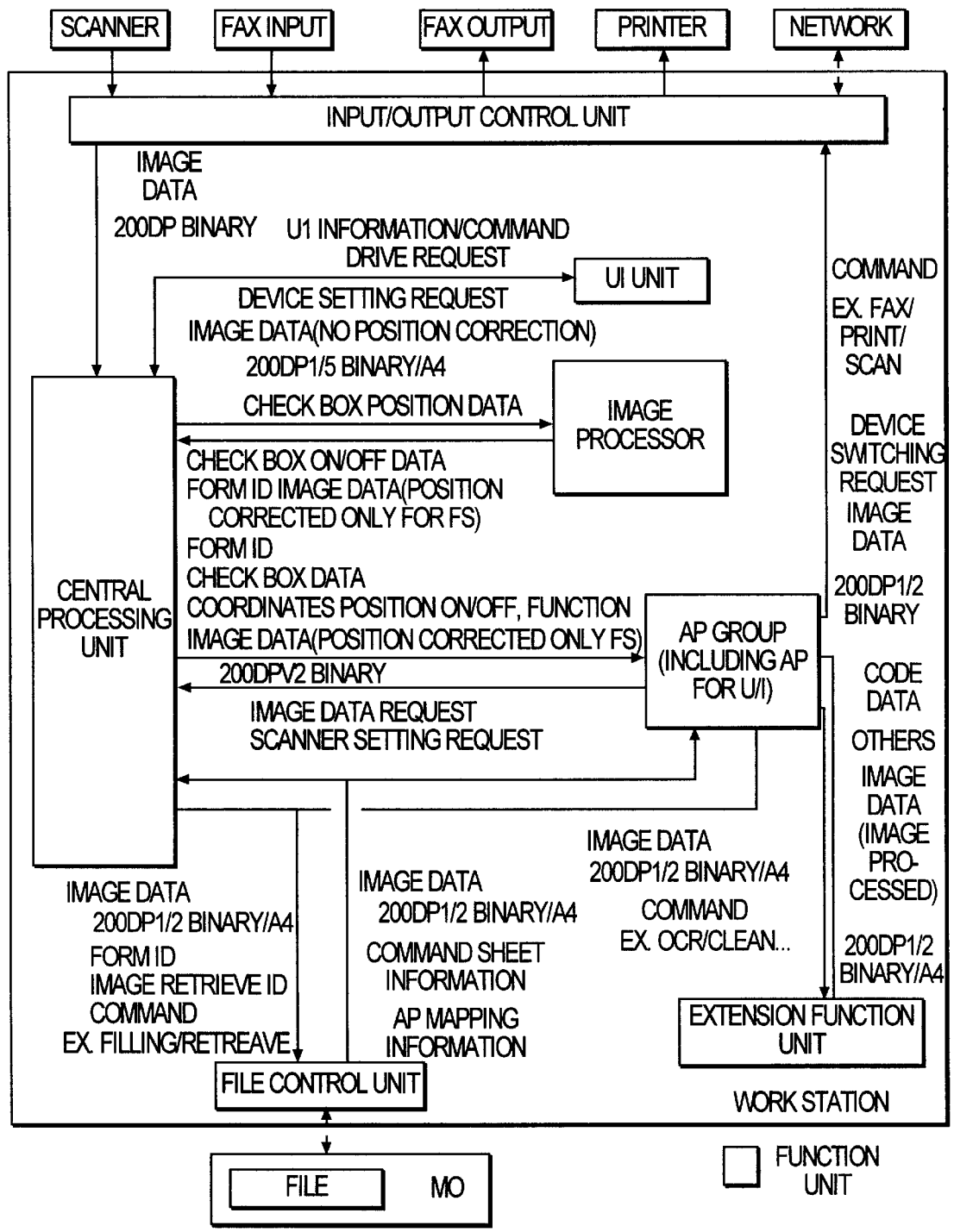
FIG. 37 is a block diagram showing data flows among the modules.

FIG. 35 is a block diagram showing process flows among the blocks. FIG. 36 is a block diagram showing the management of image data in an image file system. FIG. 37 is a block diagram showing data flows among the modules. The relationships between the constructions described in the embodiments and those in the appended claims will be described. Descriptions of the with the same names or wordings are omitted. The data base DB, the file systems, and the like correspond to the information processing system. The instructive document output portion 32 corresponds to the output means for outputting a before-written instructive document. The analysis information extracting portion 33 corresponds to the extracting means. The hard disc 11 corresponds to the recognizing means. The input/output control unit 22 and the peripheral devices 7 to 16 connected to it correspond to the input device of the information processing system. The display device 8 corresponds to the output means for outputting a before-edited instructive document. A s described above, in the first or second invention, a requested instructive document is output on the basis of previously formed I/D form information. The analysis information for analyzing the entries, such as ticks and the writing, made to the document by the user, is extracted from the I/D form information, and stored. When receiving an after-written instructive document prepared by the user is received, the input device analyzes the contents of the received document while referring to the analysis information. The results of the analysis is transmitted to the data base and the information processing system.

In the third or fourth aspect of the invention, analysis information is extracted from the information on the I/D form information. The extracted analysis information is stored in association with form identification information. When an after-written instructive document prepared by the user is received, the input device recognizes the form identification information of the document, analyzes the instructive document while referring to the analysis information corresponding to the form identification information stored, and transmits the results of the analysis to the information processing system.

In the fifth or sixth aspect of the invention, an instructive document is output to a display device. A user makes an entry to the instructive document on the display screen by using a keyboard or a mouse in an editing manner. The resultant document is supplied to the input device directly or through a network.

Also in the seventh or eighth aspect of the invention, the before-written instructive document is managed by using the form identification information. When received an after-written instructive document, the input device analyzes the contents of the received after-written instructive document on the basis of the form identification information.

The results of the analysis is supplied as input data to the information processing system. In response to this, to inform the user of the results of the process carried out by the information processing system, e.g., a list of files stored in a directory of the file system, the information processing system generates anew the file information of a new instructive document containing the file names, reduced image, and others. For the new form information, various processes, such as extraction of new analysis information, assignment of new form identification information, outputting of a new before-written instructive document by a FAX, for example, are carried out anew.

Accordingly, the user can proceed with a desired process at a remote location by simple operations as for the mark sheet and using the FAX, for example, while being interactive with the information processing system.

The instructive document of the invention allows the positions of the check boxes/ the names associated with the check boxes, and others to be laid out thereon as desired, while the layout of these items are limited in the conventional mark sheet. Accordingly, the input device and the input method for the information processing system of the present invention can make the full use of the advantages of the mark sheet.

The information on the layout and the definitions of the check boxes of the instructive document are handled in the form of I/D form information, independently of the application, thereby allowing the user interface to be used commonly. The addition and altering of the application may be realized by merely adding or altering the I/D form information associated therewith. When comparing with the conventional case where the user interface is provided for each application, the number of developing processes is remarkably reduced.

When only the instructive document to be output is handled such that the input device gives the form identification information to the instructive document when it is output, as in the third or fourth invention, an application may use the same identification information as that used by another application. Further, after a preset time elapses from the outputting thereof, the analysis information may be deleted.

In a case where eight check boxes are contained, and two types of definitions are assigned to each check boxes, 256 types of instructive documents can be used.

In the conventional method, all of these instructive documents must be managed simply. In this case, the technical ideas of the third or fourth invention requires the management for only the instructive documents actually output. Accordingly, its process is simplified, and the management and operation of the information are easy.

The fifth or sixth aspect of the invention allows a user to use the system through the user interface as on a paper, from a work station or a personal computer. Accordingly, if the medium used is changed, the user causes the system to carry out a desired process by the same operations. Therefore, a user-friendly system can be constructed.

The foregoing description of preferred embodiments of the invention have been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. An information processing system for carrying out a process on the basis of input information, the system comprising:

first storage means for storing instructive document form information describing an instructive document form and written using a page description language, wherein the instructive document form information includes information relating to a visual image of the instructive document form and to an area of the instructive document form where information can be entered by a user;

printing means for printing a before-written instructive document based on the stored instructive document form information;

receiving means for receiving an after-written instructive-document created by the user from the before-written instructive-document;

filtering means for extracting analysis information from the after-written instructive-document based on the stored instructive-document form information;

second storage means for storing the extracted analysis information;

analysis means for analyzing the information extracted from the received after-written instructive document while reading the analysis information; and processing means which receives the information on the after-written instructive document and processes the analyzed information.

2. A method for inputting information to a processing system for carrying out a process on the basis of the input information, the method comprising:

storing, in a storage device, instructive-document form information describing an instructive document form and written using a page description language, wherein the instructive document form information includes information relating to a visual image of the instructive document form and to an area of the instructive document form where information can be entered by a user;

printing a before-written instructive document based on the stored instructive-document form information;

receiving an after-written instructive-document created by the user from the before-written instructive document;

extracting analysis information from the after-written instructive-document based on the stored instructive-document form information;

storing the analysis information extracted by the extracting procedure;

analyzing the information extracted from the received after-written instructive document while reading the analysis information;

receiving the information on the after-written instructive document; and processing the analyzed information.

3. An information processing system for carrying out a process on the basis of input information, the system comprising:

first storage means for storing instructive document form information describing an instructive document form and written using a page description language, wherein the instructive document form information includes information relating to a visual image of the instructive document form and to an area of the instructive document form where information can be entered by a user;

printing means for printing a before-written instructive document based on the stored instructive document form information;

receiving means for receiving an after-written instructive-document created by the user from the before-written instructive document;

filtering means for extracting analysis information from the after-written instructive-document based on the stored instructive-document form information;

second storage means for storing the extracted analysis information in association with form identification information attached to the after-written instructive-document;

recognizing means for recognizing form identification information of the received after-written instructive document;

analysis means for analyzing the information extracted from the received after-written instructive document while reading the analysis information corresponding to the recognized form identification information; and processing means which receives the information on the after-written instructive document and processes the analyzed information.

4. An input method for an information processing system for carrying out a process on the basis of input information, the method comprising:

storing, in a storage device, instructive-document form information describing an instructive document form and written using a page description language, wherein the instructive document form information includes information relating to a visual image of the instructive document form and to an area of the instructive document form where information can be entered by a user;

printing a before-written instructive document based on the stored instructive-document form information;

receiving an after-written instructive-document created by the user from the before written instructive-document;

extracting analysis information from the after-written instructive document based on the stored instructive-document form information;

storing the extracted analysis information in association with form identification information attached to the after-written instructive-document;

recognizing the form identification information of the received after-written instructive-document;

analyzing the information on the received after-written instructive document while reading the analysis information corresponding to the recognized form identification information;

receiving the information on the after-written instructive document; and processing the analyzed information.

5. An information processing system for carrying out a process on the basis of input edits, the system comprising:

first storage means for storing instructive document form information describing an instructive document form and written using a page description language, wherein the instructive document form information includes information relating to a visual image of the instructive document form and to an area of the instructive document form where edits can be entered by a user;

generating means for generating an unedited instructive document based on the stored instructive document form information;

receiving means for receiving an edited instructive-document created by the user from the unedited instructive document;

filtering means for extracting analysis information from the edited instructive-document based on the stored instructive-document form information;

second storage means for storing the extracted analysis information;

analysis means for analyzing the information extracted from the received edited instructive-document while reading the analysis information;

processing means which receives the information on the edited instructive document and processes the analyzed information.

6. An input method for an information processing system for carrying out a process on the basis of input edits, the method comprising:

storing, in a storage device, instructive-document form information describing an instructive document form and written using a page description language, wherein the instructive document form information includes information relating to a visual image of the instructive document form and to an area of the instructive document form where edits can be entered by a user;

generating an unedited instructive document based on the stored instructive-document form information;

receiving an edited instructive-document created by the user from an unedited instructive document;

extracting analysis information from the edited instructive-document based on the stored instructive-document form information;

storing the extracted analysis information;

analyzing the information extracted from the received edited instructive document while reading the analysis information;

receiving the information on the edited instructive document; and processing the analyzed information.

7. An input device for an information processing system for carrying out a process on the basis of input information, the device comprising:

first storage means for storing instructive document form information describing an instructive document form and written using a page description language, wherein the instructive document form information includes information relating to a visual image of the instructive document form and to an area of the instructive document form where information can be entered by a user, and wherein the instructive document form information is used to generate a before-written instructive document;

receiving means for receiving an after-written instructive-document created by the user from the before-written instructive-document;

filtering means for extracting analysis information from the after-written instructive-document based on the stored instructive-document form information;

second storage means for storing the extracted analysis information; and analysis means for analyzing the information extracted from the received after-written instructive document while reading the analysis information, wherein the input device receives the information on the after-written instructive document, and inputs to the information processing system the analyzed information.

8. An input device for an information processing system for carrying out a process on the basis of input information, the device comprising:

means for receiving a first after-written instructive-document created by a first user;

means for recognizing form identification information of the received first after-written instructive document;

means for extracting analysis information from the received first after-written instructive-document based on the recognized form identification information of the received first after-written instructive-document;

means for storing in a memory the extracted analysis information in association with the form identification information of the received first after-written instructive document prior to generating a new before-written instructive document;

means for developing form identification information of the new before-written instructive-document to be output based on the stored analysis information extracted from the first after-written instructive-document and generating the new before-written instructive document from instructive-document form information inputted by a second user including the form identification information to allow information to be entered by the second user;

means for receiving a second after-written instructive-document created by the second user from the new before-written instructive document;

means for recognizing the form identification information of the received second after-written instructive document;

means for analyzing the information on the received second after-written instructive document while reading the analysis information corresponding to the recognized form identification information recognized from the second after-written instructive-document, and for supplying the results of the analysis as input data to the information processing system; and means for generating form information of the new before-written instructive-document which shows the results of processing the received input data by the information processing system, wherein the input device allows for the development and storing of the new before-written instructive document that results in a new manner of processing information.

9. An input method for an information processing system for carrying out a process on the basis of input information, said method comprising the steps of:

receiving a first after-written instructive-document created by a first user; recognizing form identification information of the received first after-written instructive document;

extracting analysis information from the received first after-written instructive-document based on the recognized form identification information of the received first after-written instructive document information;

storing in a memory the extracted analysis information in association with the form identification information of the received first after-written instructive-document prior to generating a new before-written instructive-document;

developing form information of the new before-written instructive-document to be output based on the stored analysis information extracted from the first after-written instructive-document and generating the new before-written instructive document from instructive-document form information inputted by a second user including the form identification information to allow information to be entered by the second user;

receiving a second after-written instructive document created by the second user from the new before-written instructive-document;

recognizing the form identification information of the received second after-written instructive-document;

analyzing the information on the received second after-written instructive-document while reading the analysis information corresponding to the recognized form identification information recognized from the second after-written instructive-document, and for supplying the results of the analysis as input data to the information processing system; and generating form information of the new before-written instructive-document which shows the results of processing the received input data by the information processing system, wherein the input device allows for the development and storing of the new before-written instructive document that results in a new manner of processing information.

* * * * *